(12) United States Patent
Pettegrew et al.

(10) Patent No.: US 10,084,960 B2
(45) Date of Patent: *Sep. 25, 2018

(54) PANORAMIC VIEW IMAGING SYSTEM WITH DRONE INTEGRATION

(71) Applicant: IEC Infrared Systems LLC, Middleburg Heights, OH (US)

(72) Inventors: Richard Pettegrew, Cleveland, OH (US); John Paximadis, Cleveland, OH (US)

(73) Assignee: IEC Infrared Systems, LLC, Middleburg Heights, OH (US)

( * ) Notice: Subject to any disclaimer, the term of this patent is extended or adjusted under 35 U.S.C. 154(b) by 214 days.

This patent is subject to a terminal disclaimer.

(21) Appl. No.: 14/865,939

(22) Filed: Sep. 25, 2015

(65) Prior Publication Data

US 2016/0105649 A1    Apr. 14, 2016

Related U.S. Application Data

(60) Provisional application No. 62/062,310, filed on Oct. 10, 2014.

(51) Int. Cl.
*H04N 7/18* (2006.01)
*B64C 39/02* (2006.01)
(Continued)

(52) U.S. Cl.
CPC ....... *H04N 5/23238* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS

2002/0180759 A1   12/2002   Park
2004/0183679 A1*   9/2004   Paximadis ............. G08B 13/19
                                                               340/567

(Continued)

OTHER PUBLICATIONS

Szeliski et al., "Systems and experiment Paper: Construction of Panoramic Image Mosaics with Global and Local Alignment", International Journal of Computer Vision 36(2), 101-130, 2000.*

(Continued)

*Primary Examiner* — Mohammad J Rahman
(74) *Attorney, Agent, or Firm* — Eschweiler & Potashnik, LLC

(57) ABSTRACT

Example apparatus and methods acquire individual frames of a portion of a scene under a variety of different operating parameters. Example apparatus and methods then piece together strips of frames from the individual frames. Example apparatus and methods then produce a panoramic image from the strips of frames. Frames are acquired using different imaging parameters (e.g., focal length, pan position, tilt position) under different imaging conditions (e.g., temperature, humidity, atmospheric pressure, pan rate, tilt rate). The frames may be acquired by cameras located in a panoramic view image system and in a drone. The drone may provide imagery or data. The imagery or data may be used to update or enhance the panoramic image by, for example, displaying imagery of a blind spot in the panoramic image. In different embodiments, drones may be detected or controlled.

28 Claims, 22 Drawing Sheets

(51) Int. Cl.
| | |
|---|---|
| *G06T 7/20* | (2017.01) |
| *B64D 47/08* | (2006.01) |
| *H04N 5/33* | (2006.01) |
| *G06T 7/00* | (2017.01) |
| *H04N 5/232* | (2006.01) |
| *H04N 5/225* | (2006.01) |
| *G06T 3/00* | (2006.01) |
| *H04N 5/265* | (2006.01) |
| *G01C 3/08* | (2006.01) |
| *G01S 7/48* | (2006.01) |
| *G01S 17/42* | (2006.01) |
| *G06T 5/50* | (2006.01) |
| *G06T 3/40* | (2006.01) |
| *H04N 5/357* | (2011.01) |
| *H04N 17/00* | (2006.01) |
| *G06T 7/80* | (2017.01) |

(52) U.S. Cl.
CPC .............. *G01C 3/08* (2013.01); *G01S 7/4808* (2013.01); *G01S 17/42* (2013.01); *G06T 3/0062* (2013.01); *G06T 3/0093* (2013.01); *G06T 3/4038* (2013.01); *G06T 5/50* (2013.01); *G06T 7/80* (2017.01); *H04N 5/2252* (2013.01); *H04N 5/2254* (2013.01); *H04N 5/2256* (2013.01); *H04N 5/2258* (2013.01); *H04N 5/23216* (2013.01); *H04N 5/23229* (2013.01); *H04N 5/265* (2013.01); *H04N 5/33* (2013.01); *H04N 5/3572* (2013.01); *H04N 7/185* (2013.01); *H04N 17/002* (2013.01); *B64C 2201/127* (2013.01); *B64C 2201/146* (2013.01); *G06T 2207/10032* (2013.01); *G06T 2207/10048* (2013.01); *G06T 2207/20221* (2013.01)

(56) References Cited

U.S. PATENT DOCUMENTS

| | | | |
|---|---|---|---|
| 2004/0223062 A1* | 11/2004 | Pettegrew | F16M 11/18 348/211.4 |
| 2005/0024606 A1 | 2/2005 | Li | |
| 2006/0238617 A1 | 10/2006 | Tamir | |
| 2007/0228278 A1* | 10/2007 | Paximadis | G01J 1/44 250/330 |
| 2007/0237423 A1* | 10/2007 | Tico | G06T 3/4038 382/284 |
| 2008/0049123 A1* | 2/2008 | Gloudemans | H04N 5/222 348/239 |
| 2009/0160936 A1 | 6/2009 | McCormack | |
| 2010/0097442 A1 | 3/2010 | Lablans | |
| 2010/0141735 A1 | 6/2010 | Yamashita | |
| 2011/0157386 A1 | 6/2011 | Ishii | |
| 2011/0194851 A1 | 8/2011 | Hjelmstrom | |
| 2011/0211040 A1* | 9/2011 | Lindemann | G01C 11/02 348/36 |
| 2012/0062695 A1 | 3/2012 | Sakaki | |
| 2012/0243746 A1 | 9/2012 | Higashimoto | |
| 2013/0229529 A1 | 9/2013 | Lablans | |
| 2014/0063055 A1* | 3/2014 | Osterhout | G06F 3/005 345/633 |
| 2014/0226002 A1 | 8/2014 | Metzler | |
| 2014/0247323 A1 | 9/2014 | Griffis | |
| 2014/0267775 A1 | 9/2014 | Lablans | |
| 2015/0055886 A1 | 2/2015 | Oh et al. | |
| 2015/0381968 A1 | 12/2015 | Arora | |
| 2016/0094840 A1 | 3/2016 | Warner | |
| 2016/0104284 A1 | 4/2016 | Maguire | |
| 2016/0105649 A1* | 4/2016 | Pettegrew | G06T 7/80 348/37 |
| 2016/0125234 A1 | 5/2016 | Ota | |
| 2016/0129283 A1 | 5/2016 | Meir | |
| 2016/0227193 A1 | 8/2016 | Osterwood | |
| 2017/0018112 A1* | 1/2017 | Vaganov | G06T 15/10 |
| 2017/0163888 A1* | 6/2017 | Norland | H04N 7/181 |

OTHER PUBLICATIONS

U.S. Appl. No. 14/865,483, filed Sep. 25, 2015.
U.S. Appl. No. 14/865,621, filed Sep. 25, 2015.
U.S. Appl. No. 14/865,799, filed Sep. 25, 2015.
Notice of Allowance dated Apr. 15, 2016 in connection with U.S. Appl. No. 14/865,799.
Non-Final Office Action in connection with U.S. Appl. No. 14/865,483.
Final Office Action in connection with U.S. Appl. No. 14/865,483.
Non-Final Office Action in connection with U.S. Appl. No. 14/865,621.
Notice of Allowance in connection with U.S. Appl. No. 14/865,483.
Final Office Action in connection with U.S. Appl. No. 14/865,621.
Szeliski, et al., "Systems and experiment Paper: Construction of Panoramic Image Mosaics with Global and Local Alignment", International Journal of Computer Vision 36(2), 101-130, 2000.

* cited by examiner

PANORAMIC VIEW IMAGING SYSTEM WITH DRONE INTEGRATION

CROSS-REFERENCE TO RELATED APPLICATIONS

This application claims the benefit of U.S. Provisional Application 62/062,310 filed Oct. 10, 2014.

BACKGROUND

Many cameras take panoramic images that are adequate for remembering a scene from vacation. While the panoramic image may be suitable for recalling a vacation moment, the panoramic image may be unsuitable for security or military related applications where potentially life and death decisions concerning the delivery of ordinance or other active measures or counter-measures may need to be made in real-time under situational pressures. Data for conventional panoramic images tends to be acquired by a single apparatus along a single axis and contains just the information needed to display a digital version of the panoramic image.

A panoramic imaging system may acquire multiple images (e.g., digital photographs) that when processed into a single image provide a larger field of view than is available in a single image. Conventionally there have been different approaches for acquiring the data for the multiple images that are processed together into a single image that has a larger field of view. Regardless of how the data and multiple images are processed into the single image, the single image still tends to include just the color or intensity information needed to display a digital version of the panoramic image. These panoramic views have typically been unsuitable for certain military applications where real-time decisions need to be made based on surveillance imagery.

Some imaging systems may use active approaches (e.g., radar) to provide additional information for increasing the richness of data associated with a panoramic image. Active measures may be inappropriate for some panoramic view imaging approaches.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
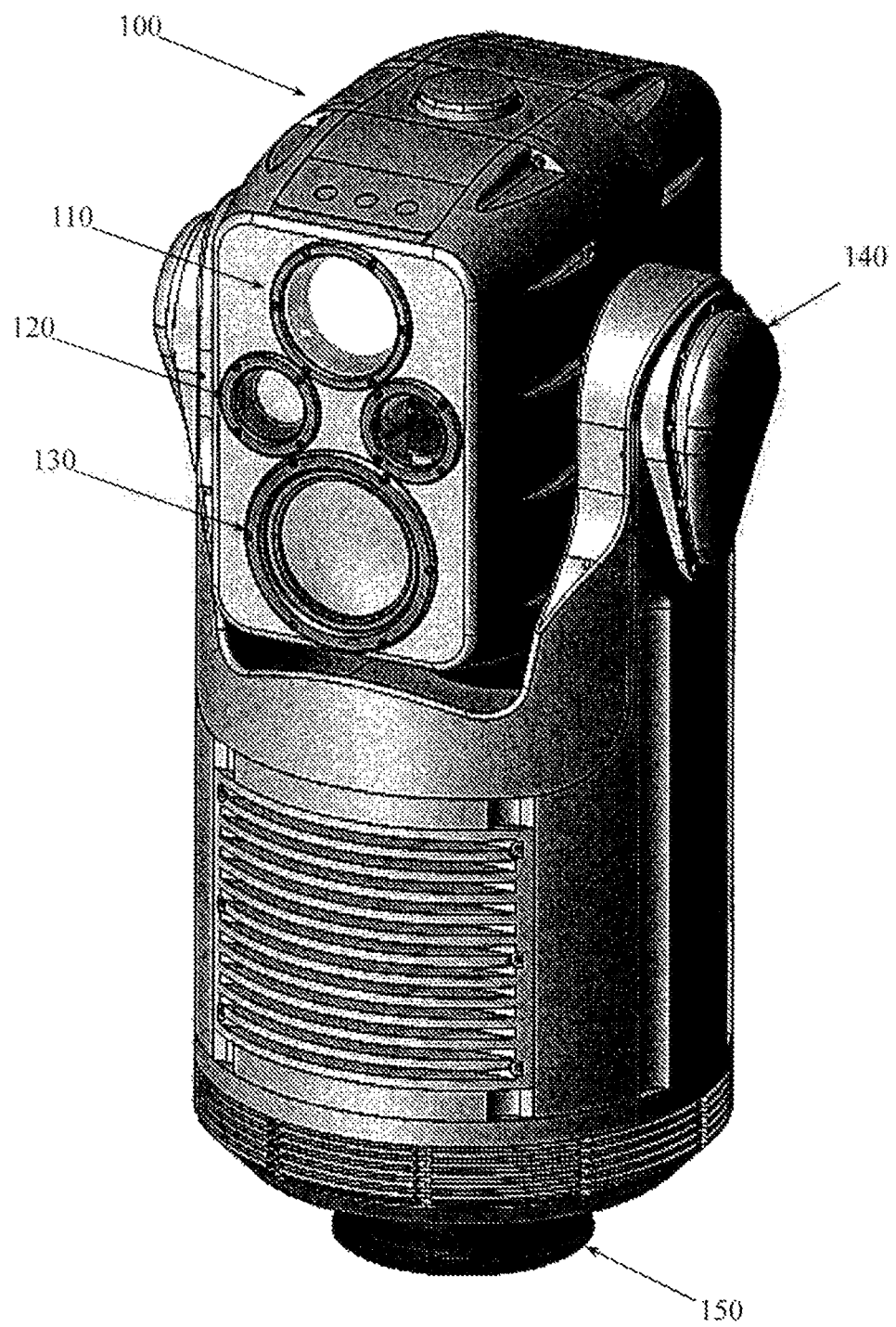
FIG. 1 illustrates an example panoramic imaging system.

Example apparatus and methods provide a panoramic view imaging system (PVIS) that provides imagery suitable for security applications (e.g., military) based, at least in part, on data or imagery acquired by a drone. As used herein, "drone" refers to an unmanned aerial vehicle (UAV), which may also be referred to as a remotely piloted aircraft (RPA). The flight of the drone is controlled either autonomously by onboard computers or by remote control by a "pilot" at a location remote from the drone. In one embodiment, the pilot may be a process or circuit running on a PVIS.

Example apparatus and methods provide, in real-time or substantially in real-time, an image compiled from a collection of frames. The compiled image has a greater field of view (FOV) than the individual frames. An example PVIS may receive data or imagery from a drone, respond to data or imagery from a drone, control a drone, or detect a drone.

Frames acquired by an example PVIS may be digital images of a portion of a scene. Example apparatus and methods may capture multiple frames at multiple azimuth and elevation positions using multiple fields of view or multiple zoom levels under different operating conditions while being panned or tilted from position to position at various rates or accelerations.

Example apparatus and methods may also receive data or imagery from a drone. In different embodiments the data may be acquired using passive sensors or active sensors. Data acquired using passive sensors may include, for example, range data, elevation data, global positioning system (GPS) data, temperature data, humidity data, barometric pressure data, sound data, radiation level data, imagery, or other data. Data acquired using active sensors may include, for example, radar reflections or laser reflections.

Example apparatus and methods may receive imagery from a drone. The imagery may come from cameras operating in different spectra including, for example, visible light, infrared (IR), near IR (NIR), short wave IR (SWIR), mid wave IR (MWIR), long wave IR (LWIR), or ultraviolet (UV). In one embodiment, the imagery from a drone may be provided by a PVIS operating on the drone. When the imagery from a drone is provided by a PVIS operating on the drone, then a panoramic view image may include look-back, overhead, or look-through data that may not be available from conventional systems.

Example apparatus and methods may control the position of a drone. For example, a drone may be positioned to facilitate acquiring frames for a portion of a scene that may be obscured from a PVIS. In one embodiment, a drone may be positioned to facilitate acquiring frames that illustrate the PVIS as viewed when looking back at the PVIS from a position in the scene. Looking back at a PVIS may facilitate improving the concealment or other location considerations for a PVIS.

Example apparatus and methods may detect a drone. A drone may be detected in response to a change in a frame, a change in a strip of frames, a change in a panoramic image, a change in range data, a change in edges used in pattern matching, or in other ways. For example, a first frame may have a first set of elements and edges that are suitable for pattern matching with other frames. A second frame may also include a second set of elements and edges that are suitable for pattern matching. Frames are stitched together using pattern matching on the edges and elements. When the edges and elements do not align, and the misalignment cannot be resolved by correcting for FOV or magnification, then the edge or element that caused the misalignment may be examined more closely. The nature of the misalignment may indicate the appearance or movement of an item (e.g., drone) in the scene. This is one way that a drone may be detected. In one embodiment, a movement or intruder alert may be generated upon detecting a change in pattern matching data (e.g., edge, item).

A drone may be detected based on a change in a frame. A first frame may be acquired at a first time with first azimuth and elevation positions. A second frame may be acquired at a second (e.g., later) time but with the same first azimuth and elevation positions. The first frame and the second frame may have different elements. For example, if an object (e.g., drone) enters the scene between the first frame acquisition and the second frame acquisition, then the two images would differ because of the appearance of the drone. Example apparatus and methods may therefore detect the presence of a drone or other item that entered a scene by pattern matching frames acquired at different times to identify additional items. A movement or intruder alert may be triggered upon detecting the change in the frames.

Example apparatus and methods may also acquire range information associated with locations in frames acquired from the PVIS or the drone. In one embodiment, range information may be acquired for every pixel in a frame. In other embodiments, range information may be acquired for less than every pixel in a frame. In one embodiment, range information may be estimated for some pixels based on actual range information from other pixels. Example apparatus and methods may determine for which pixels actual range information is to be acquired and for which pixels estimated range information will be computed. The range information may be used to control the movement of the drone, to integrate data or imagery acquired from the drone with imagery acquired by a PVIS, or for other reasons. A drone may be detected based on a change in range data. For example, the range to an item associated with a pixel in the panoramic image will likely remain the same unless the scene changes when, for example, a drone enters the scene. When the drone enters the scene, the initial range information for a pixel may not match the current range information. The changing range information may trigger a movement or intruder alert.

Example apparatus may include a number of lenses and sensors, may change relationships between the lenses and sensors, and may operate under a wide range of operating conditions. For example, a PVIS may produce real-time imagery from a unit that is spinning at sixty revolutions per minute, that is being tilted while spinning, that is simultaneously collecting electromagnetic radiation in multiple spectra, and that is operating in temperature ranges from below −40 C to over +50 C, in humidity ranges from substantially zero percent to substantially one hundred percent, in atmospheric pressure ranges from less than one atmosphere to more than one atmosphere, and in varying light conditions. In one embodiment, light conditions may be artificially altered by, for example, smoke or other materials that intentionally obscure a scene. Thus, an example PVIS may control a drone to reposition itself to acquire imagery or data from a location that has become obscured or occluded.

FIG. 1 illustrates an example panoramic imaging system 100. System 100 may include a visual light acquisition assembly 110, a laser range finding apparatus 120, and a second (e.g., thermal, IR, UV) imaging assembly 130. Different panoramic imaging systems may include different numbers and types of sensors arranged in different configurations. System 100 may be panned using assembly 150 and may be tilted using assembly 140. Panning assembly 150 and tilting assembly 140 are representative and other panning apparatus or tilting apparatus may be employed. Panning assembly 150 may also be referred to as a rotational position controller. Panning assembly 150 may include an azimuthal position encoder or rotational position encoder that measures the azimuthal position at which a frame is acquired. Tilting assembly 140 may also be referred to as an elevation position controller. Tilting assembly 140 may include an elevation position encoder that measures the elevation position at which a frame is acquired. Azimuthal or elevation positions may be acquired and associated with a frame when the frame is acquired.

System 100 may also include a zoom controller that changes the focal length of the visual light acquisition assembly 110 or the second imaging assembly 130. System 100 may also include an image processor that produces a panoramic image from a plurality of frames produced by the visual light frame acquisition assembly 110, the second imaging assembly 130, or a drone that communicates with system 100. The panoramic image has a field of view greater in both a horizontal dimension and a vertical dimension than a single frame acquired by the visual light acquisition assembly 110, by the second imaging assembly 130, or by the drone. The panoramic image is produced without using a hemispherical mirror or a fisheye lens.

In one embodiment, a laser in laser range finding apparatus 120 may be co-axially mounted with an image acquisition assembly in PVIS 100. Range data from the laser range finding apparatus 120 may facilitate interacting with a drone to control the acquisition of data or imagery, to control the position of a drone, to control delivery of ordinance or other measures, or for detecting a drone. For example, the drone may be positioned over or near a relevant location and the range to the drone may be accurately measured using the laser range finding apparatus 120. The up-to-date accurate range information may be then be used for subsequent actions (e.g., ordinance delivery). In one embodiment, the laser range finding apparatus 120 produces or accesses a virtual wire grid of range data that includes range information for locations in a panoramic image produced by system 100. It may be difficult to acquire range data for some locations in a scene using laser range finding. For example, the space above a building may be sky that would not provide accurate range information using a laser. However, a helicopter may descend to land on the roof of the building and thus having accurate range information for the approaches to the roof of the building may be prudent in certain situations. Thus, a drone may be controlled to fly into certain spaces to provide a target for laser range finding in those spaces that would otherwise report "infinity" as the range.

System 100 also includes a drone assembly that receives data or imagery from a drone or provides command and control to a drone. The drone assembly may include a transmitter, a receiver, a transceiver, or other communication apparatus.

In one embodiment, apparatus 100 may pan (e.g., move in a horizontal plane) to provide three hundred and sixty degrees of horizontal coverage and tilt (e.g., move in a vertical plane) to provide at least one hundred and eighty degrees of vertical coverage. Apparatus 100 may acquire images from a lens and sensor assembly that moves through multiple degrees of freedom to pan and tilt. With this range of pan and tilt available, apparatus 100 may acquire images that cover all or a portion (e.g., hemisphere) of a sphere centered at the location of apparatus 100. Thus, apparatus 100 produces a panoramic view that facilitates providing superior situational awareness for a viewer. The expansive situational awareness may be appropriate for security applications including, for example, military surveillance, police surveillance, prison perimeter monitoring, embassy protection, power plant protection, or other applications.

The expansive situational awareness may be enhanced by integration with a drone. For example, a drone may provide additional imagery or data to system 100. The imagery may be used to replace or enhance imagery produced from assembly 110 or assembly 130. The data may be used to enhance (e.g., annotate, color code) imagery produced from assembly 110 or assembly 130.

Apparatus 100 may have multiple different sensors (e.g., cameras) that acquire electromagnetic radiation in multiple spectra to produce multiple types of images. In one embodiment, apparatus 100 may acquire electromagnetic radiation using visible spectra sensors, IR spectra sensors, UV spectra sensors, laser range finding sensors, and other sensors. The IR sensors may detect different types of IR electromagnetic radiation including, for example, NIR, SWIR, or LWIR. In one embodiment, different types of images may be combined or overlaid to produce images that provide a more complete view of a scene. Using multiple imaging modalities in multiple spectra (e.g., visible, IR) facilitates providing a day/night, all-weather surveillance capability.

In one embodiment, imagery from a drone may be integrated with imagery acquired by apparatus 100. The imagery from the drone may also be from various types of sensors including, for example, visible light, IR, or UV. Additionally, data from a drone may be integrated with imagery acquired by apparatus 100. For example, a panoramic view image may be annotated with temperature readings acquired by a drone. Similarly, radiation levels, noise levels, humidity readings, or other sensor readings may be used to annotate or otherwise enhance a panoramic view image. Acquiring information about the temperature, humidity, wind speed, and wind direction may facilitate enhancing the panoramic view image, which may in turn facilitate more accurately delivering ordinance or other active measures.

Producing a panoramic view, or providing wide-area imagery, involves a tradeoff between the spatial extent of the FOV that is observed and the range at which a target of a given size can be resolved. For example, a camera having a FOV of 12 horizontal degrees and 9 vertical degrees at a certain zoom level may be able to resolve a target sufficiently to detect an upright soldier at a range of 1500 m. However, another camera having a FOV of 4 horizontal degrees and 3 vertical degrees and a tighter zoom level might be able to detect and resolve the same solider at a range of 3500 m. While more space can be imaged with the FOV of 12/9 and the lesser zoom, the items in the view would be smaller and thus harder to distinguish. While less space can be imaged with the FOV of 4/3, the items in the view would be more magnified and thus easier to distinguish.

Figure 2:
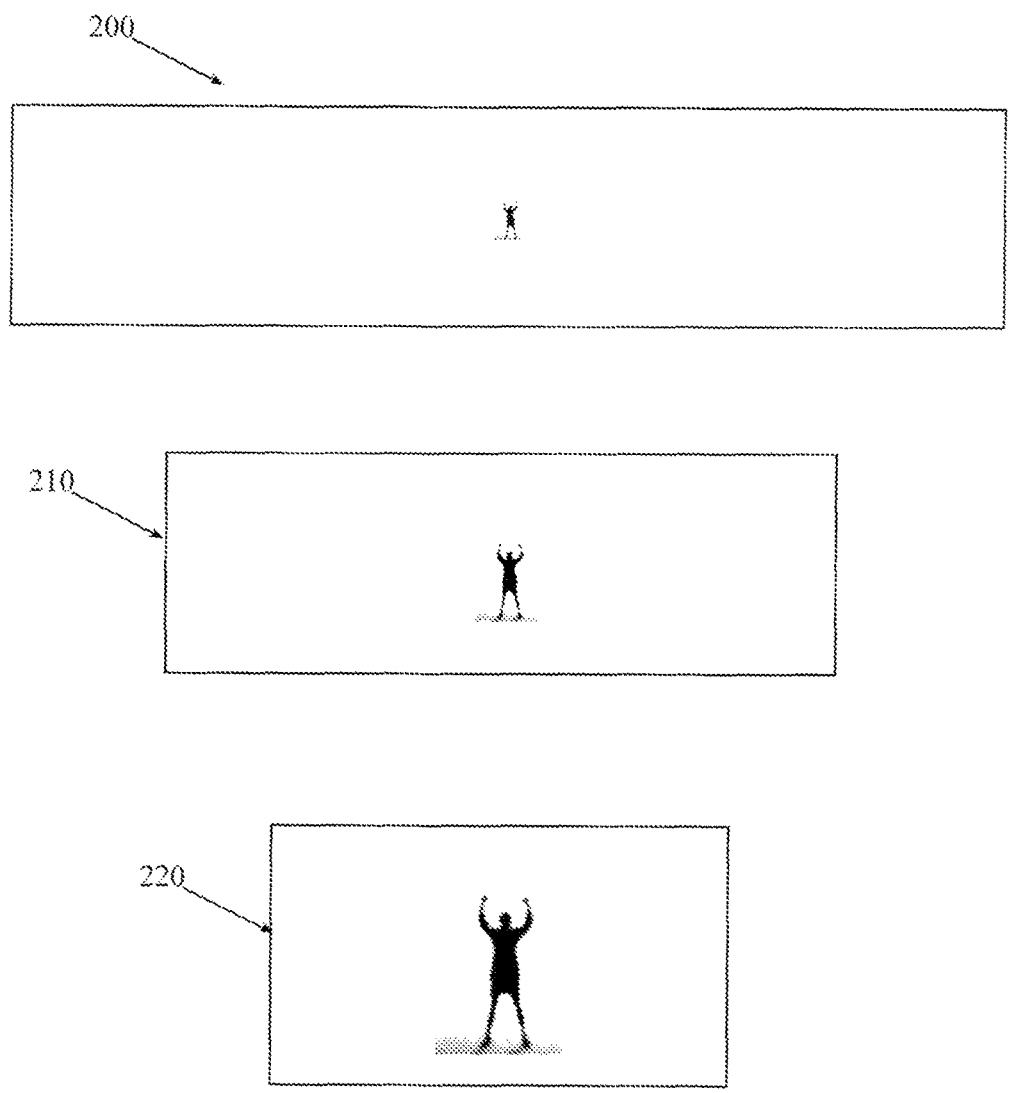
FIG. 2 illustrates frames with different fields of view and resolution.

FIG. 2 illustrates a first image 200 that has a first field of view and zoom level. It may be difficult, if even possible at all, to resolve or even detect a figure standing in image 200. FIG. 2 also illustrates a second image 210 that has a smaller field of view and a higher zoom level. It may be more possible, but still difficult to resolve a figure standing in image 210. FIG. 2 also illustrates a third image 220 that has a smallest field of view and greatest zoom level. It may be possible to resolve the figure standing in image 220. Producing a panoramic image of a scene from frames with the FOV and zoom level of image 200 would take less time than producing a panoramic image of the same scene from frames with the FOV and zoom level of image 220 but the resulting image would have less magnification. Thus, in one embodiment, a drone may automatically be controlled to proceed to a position to acquire additional images based, at least in part, on a detection/resolution threshold associated with a FOV of the PVIS. For example, a PVIS may image a scene at a lower magnification level and when an item is detected but cannot be identified or resolved, a drone may be directed to move to a position from which imagery can be acquired that will facilitate resolving or identifying the item. Controlling the drone to image the item may facilitate allowing the PVIS to continue operating in a wider FOV with a lower magnification.

Example cameras may acquire raw image data. Raw image data may be used to produce a series of individual frames of various portions of a scene. Raw image data may have anomalies that result from aberrations in lenses or sensors used to acquire the raw image data. The raw image data may be corrected using data acquired during a calibration process. In one embodiment, the raw image data is de-warped to produce de-warped individual images. An individual frame is de-warped by performing a transform on stored electronic data. The stored electronic data is transformed using pre-determined coefficients that stretch the frame from a warped appearance back to a correct shape. The coefficients may be available from a previously performed calibration process. De-warping raw image frames addresses the inherent warping of image edges that occurs when a 3D scene is projected onto a 2D plane. Correcting raw image frames addresses anomalies that may result from aberrations in lenses or sensors. Raw image frames may be corrected (e.g., de-warped) before being made available for stitching into a strip of frames.

Figure 3:
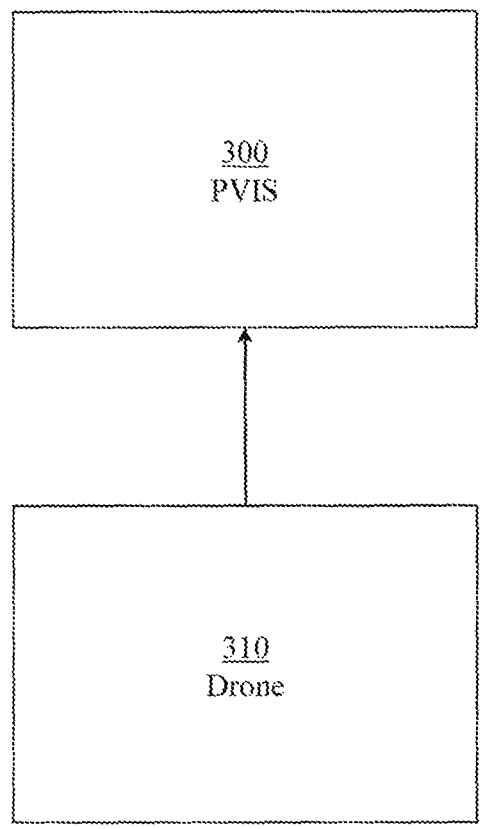
FIG. 3 illustrates an example PVIS interacting with a drone.

FIG. 3 illustrates a PVIS 300 interacting with a drone 310. Drone 310 is providing imagery or other data to PVIS 300. In one embodiment, drone 310 can be used to enhance or confirm calibration for PVIS 300. For example, drone 310 may have a known size and thus when positioned at a known distance from PVIS 300 can be useful for determining or confirming the effective focal length of a camera that is part of PVIS 300. In one embodiment, PVIS 300 may display a pattern of known size and shape that may be used to determine or confirm the effective focal length of a camera that is part of PVIS 300.

Figure 4:
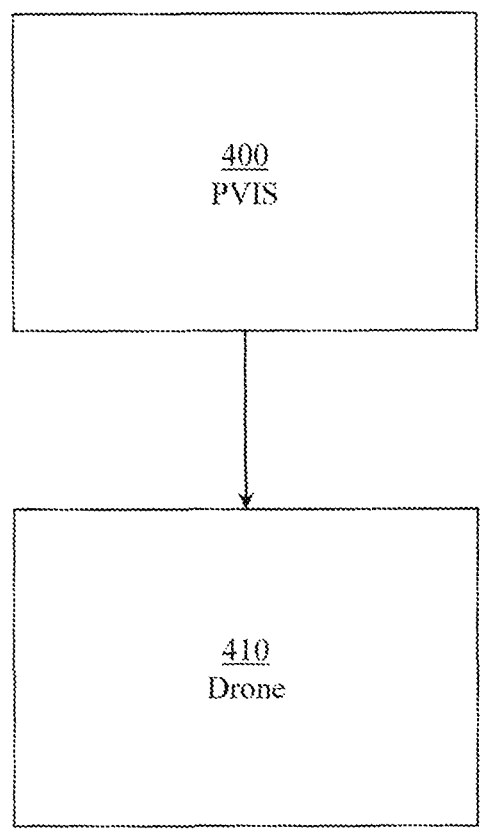
FIG. 4 illustrates an example PVIS interacting with a drone.

FIG. 4 illustrates a PVIS 400 interacting with a drone 410. PVIS 400 is providing data or control instructions to drone 410. The data or control instructions may cause drone 410 to move to a location and to perform an action. The location may be described by, for example, absolute co-ordinates (e.g., x/y/z, GPS) or by relative co-ordinates (e.g., distance and angle from PVIS 400). The action may be, for example, to acquire an image while looking in a certain direction or to acquire a sensor reading.

Figure 5:
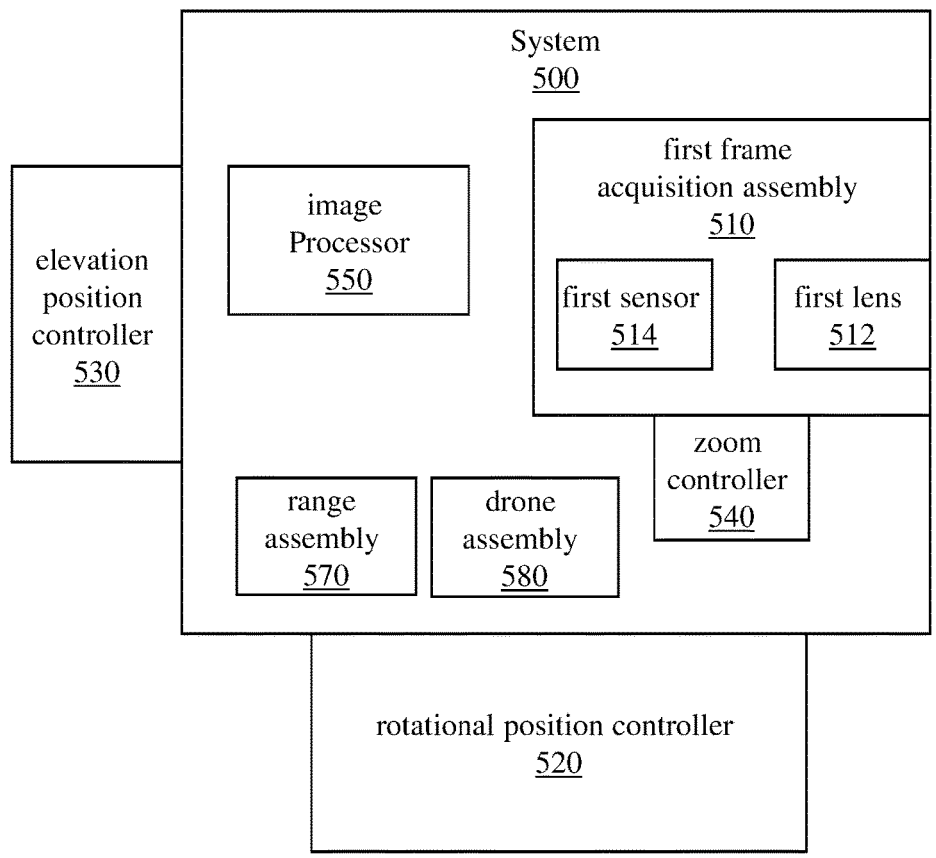
FIG. 5 illustrates an example panoramic view imaging system (PVIS).

FIG. 5 illustrates a panoramic view imaging system 500. System 500 includes a first frame acquisition assembly 510 comprising a first lens 512 and a first sensor 514 that produce a first frame from light in a visible spectrum. In one embodiment, the first frame acquisition assembly 510 produces frames at a rate of at least sixty images per second. Acquiring frames at such a high frame rate may facilitate detecting items (e.g., drones) that appear in a scene, that disappear from a scene, or that move in a scene. Frames may be acquired at other rates.

The system 500 includes a rotational position controller 520 that pans the system 500 or first frame acquisition assembly 510 through a range of horizontal imaging positions and an elevation position controller 530 that tilts the system 500 or the first image acquisition 510 assembly through a range of vertical imaging positions. In one embodiment, the range of horizontal imaging positions is three hundred and sixty degrees, and the range of vertical imaging positions is at least one hundred and eighty degrees. Other ranges may be employed.

The apparatus 500 also includes a range assembly 570 that provides access to a portion of a spherical grid of range data for locations in a panoramic image produced by apparatus 500. In one embodiment, a portion of the data in the spherical grid of range data may be provided by a drone.

The apparatus 500 also includes a drone assembly 580 that interacts with a drone. Interacting with a drone may include receiving radio frequency or optical communications that include data concern imagery observed by the drone or sensor readings acquired by the drone. Interacting with a drone may also include providing data or signals to the drone using RF or optical communications.

The apparatus 500 also includes a zoom controller 540 that changes the focal length of the first frame acquisition assembly 510 by, for example, moving the lens 512 with respect to the sensor 514 or vice versa. The zoom controller 540 may also change the zoom level for other frame acquisition assemblies. Zoom is just one parameter that may be manipulated during operation. Other operational parameters that can be manipulated may include, for example, horizontal position, vertical position, target grid co-ordinates, pitch, yaw, field of view, focal length, depth of field, pan rate, tilt rate, change in pan rate, or change in tilt rate.

The apparatus 500 also includes an image processor 550 that produces a panoramic image from a plurality of frames produced by the first frame acquisition assembly 510 and from a drone. The panoramic image has a field of view greater in both a horizontal dimension and a vertical dimension than a single frame acquired by the first frame acquisition assembly 510 or by the drone. The panoramic image is produced without using a hemispherical mirror or fisheye lens. In one embodiment, the panoramic view may be enhanced with information provided by a drone. For example, a frame acquired by a drone may be added to the panoramic image or may replace a frame in the panoramic image. In another example, the panoramic image may be annotated with data provided by the drone. The data may be from, for example, a Geiger counter, a thermometer, a barometer, a microphone, or other sensor.

Figure 6:
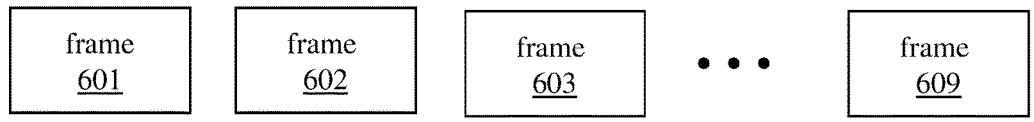
FIG. 6 illustrates a series of individual frames acquired while an example panoramic imaging system rotates while maintaining a single tilt elevation.

FIG. 6 illustrates a series of frames that are acquired while an example apparatus rotates at a single elevation without tilting. Since the same elevation is maintained, frames 601, 602, and 603 through 609 may be horizontally aligned. Acquiring images without tilting may occur when a PVIS is mounted on a stable stationary apparatus and is not being tilted.

Figure 7:
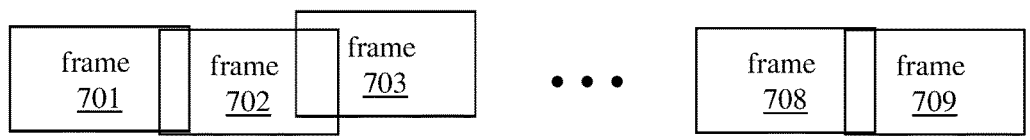
FIG. 7 illustrates a series of individual frames acquired while an example panoramic imaging system rotates while not maintaining a single tilt elevation.

FIG. 7 illustrates a series of frames that are acquired while an example apparatus rotates and tilts, intentionally or otherwise. Since the same elevation is not maintained, frames 701, 702, and 703 through 708 and 709 may not be horizontally aligned. Tilting may occur intentionally when the PVIS is controlled to move to a different elevation. Tilting may occur unintentionally when the PVIS is subjected to external forces. For example, when a PVIS is mounted on a moving wheeled vehicle (e.g., HUMVEE, truck) the wheeled vehicle may be tilted up and down as it moves over the terrain. In another example, when a PVIS is mounted in a drone, the drone may move in several axes simultaneously which may result in tilting. Unlike conventional systems that may require a stable platform and no tilting during acquisition, example apparatus and methods may account for tilting or other displacements during image acquisition using pattern matching based vertical and horizontal stitching of frames and strips of frames.

Figure 8:
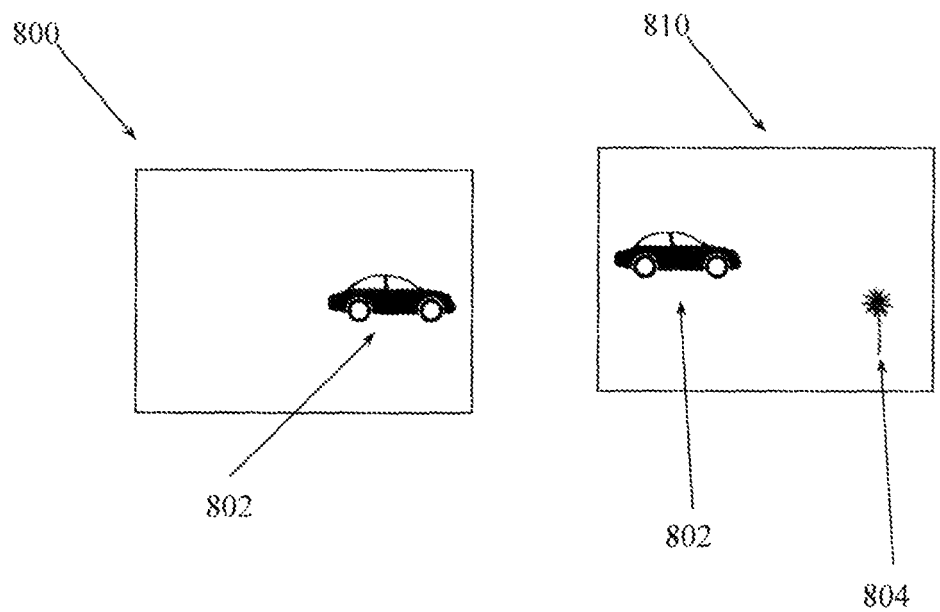
FIG. 8 illustrates two adjacent frames acquired while an example panoramic imaging system rotates.

FIG. 8 illustrates adjacent frames 800 and 810. Frame 800 includes a car 802 and frame 810 includes the car 802 and a palm tree 804. Azimuthal and elevation information associated with the frames describes the horizontal and vertical position at which the frames were acquired. Stitching together or otherwise arranging a composite image from frame 800 and 810 may include a two-step process. First, the frames 800 and 810 may be initially positioned using the azimuthal and elevation information. Second, the frames 800 and 810 may be repositioned to a more refined position based on pattern matching that facilitates aligning frames 800 and 810. Example apparatus and methods may persist pattern matching information that is used to reposition frames. For example, edge location information, edge size information, edge orientation information, or other information may be stored in a memory or computer-readable medium in an example PVIS. In one embodiment, frames 800 and 810 are both acquired from the same PVIS. In another embodiment, frames 800 and 810 may be acquired from different apparatus. For example, frame 800 may be acquired from a PVIS and frame 810 may be acquired from a drone.

Figure 9:
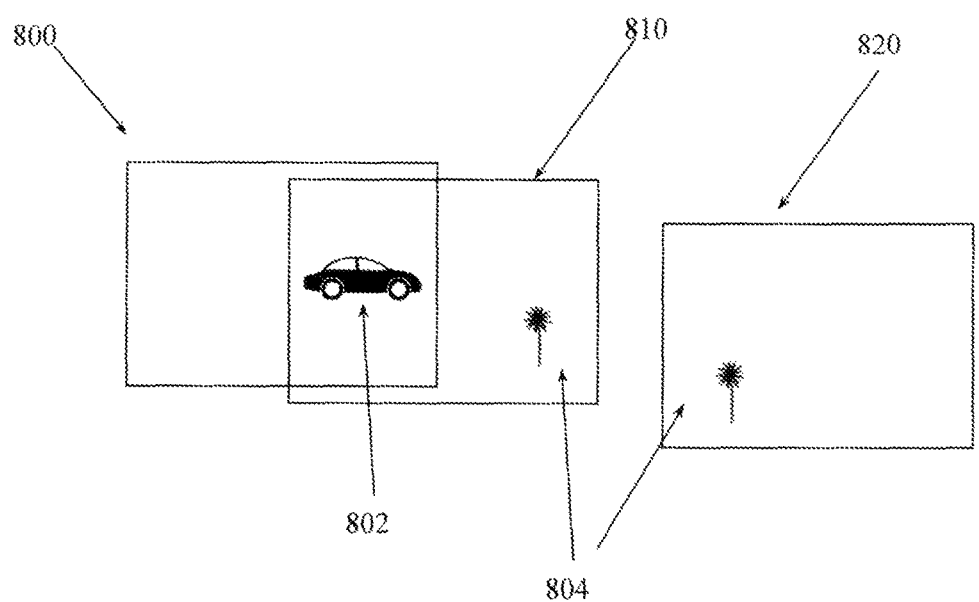
FIG. 9 illustrates adjacent frames acquired while an example panoramic imaging system rotates and the alignment of those frames.

FIG. 9 illustrates how frame 800 and frame 810 have been aligned based on pattern matching of car 802. FIG. 9 also illustrates a next frame 820 that includes palm tree 804. In one embodiment, frames 800 and 810 may be roughly positioned using the azimuthal and elevation information and then more finely positioned using pattern matching while frame 820 is being acquired. Recall that acquiring frame 820 may involve repositioning the imaging apparatus, which may provide time for the processing involved in stitching together frames 800 and 810.

Figure 10:
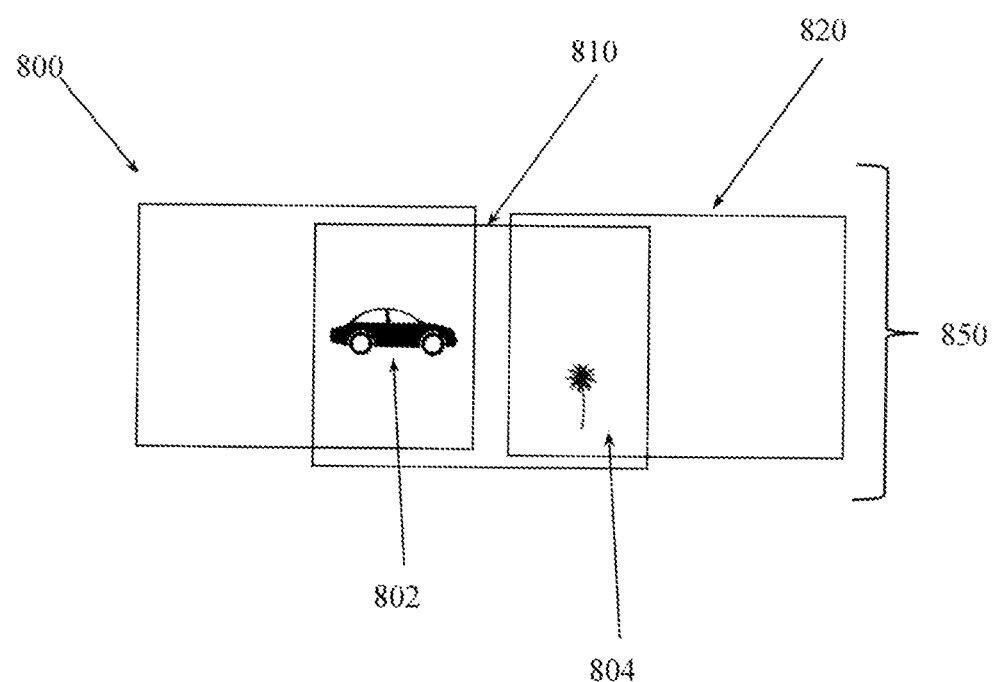
FIG. 10 illustrates frames being aligned.

FIG. 10 illustrates frame 820 being aligned with frame 810 based on pattern matching of the palm tree 804. Frames 800, 810, and 820 are taking on the appearance of a strip of frames 850. A complete strip of frames may include more than just three frames, but this smaller number is used for ease of illustration and explanation. In one embodiment, all the frames for the strip of frames 850 may be acquired by a single PVIS. In another embodiment, one or more of the frames in strip of frames 850 may be acquired from a drone.

Figure 11:
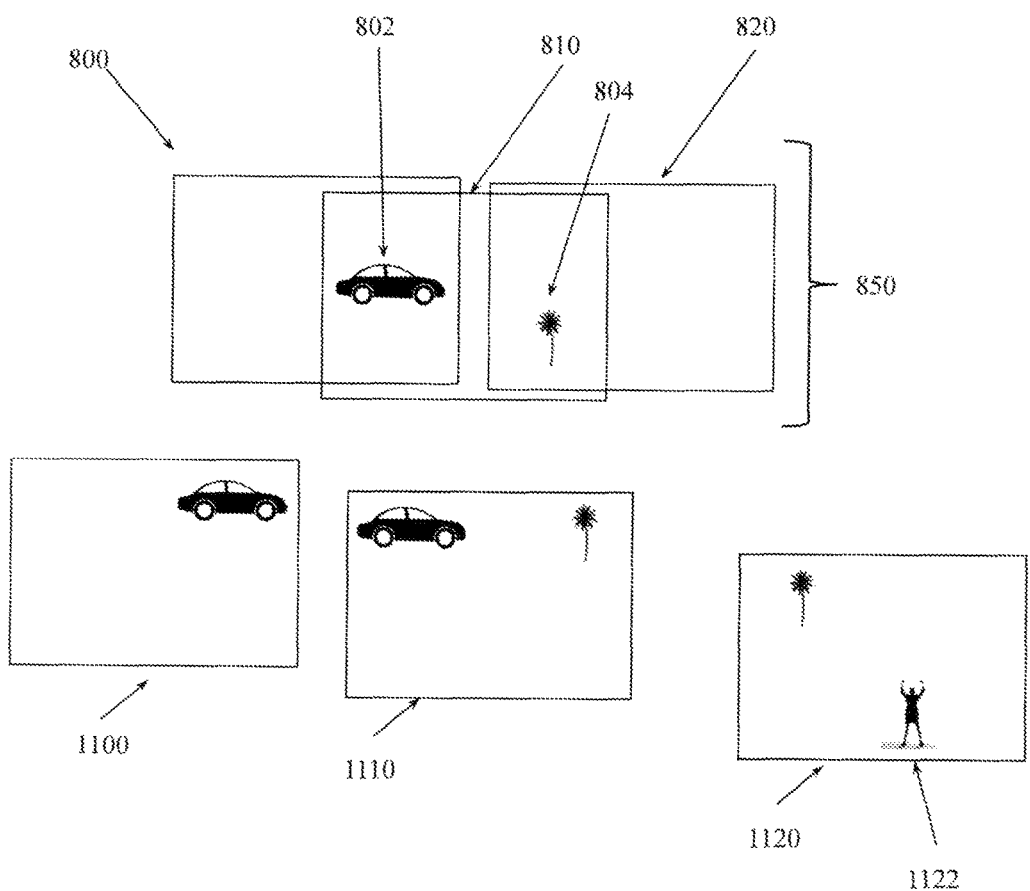
FIG. 11 illustrates frames being aligned.

FIG. 11 illustrates additional frames 1100, 1110, and 1120 that were acquired by panning across the scene that produced frames 800, 810, and 820 but at a different tilt angle. Once again, azimuthal and elevation information is available to roughly position frames 1100, 1110, and 1120 as illustrated in FIG. 9.

Figure 12:
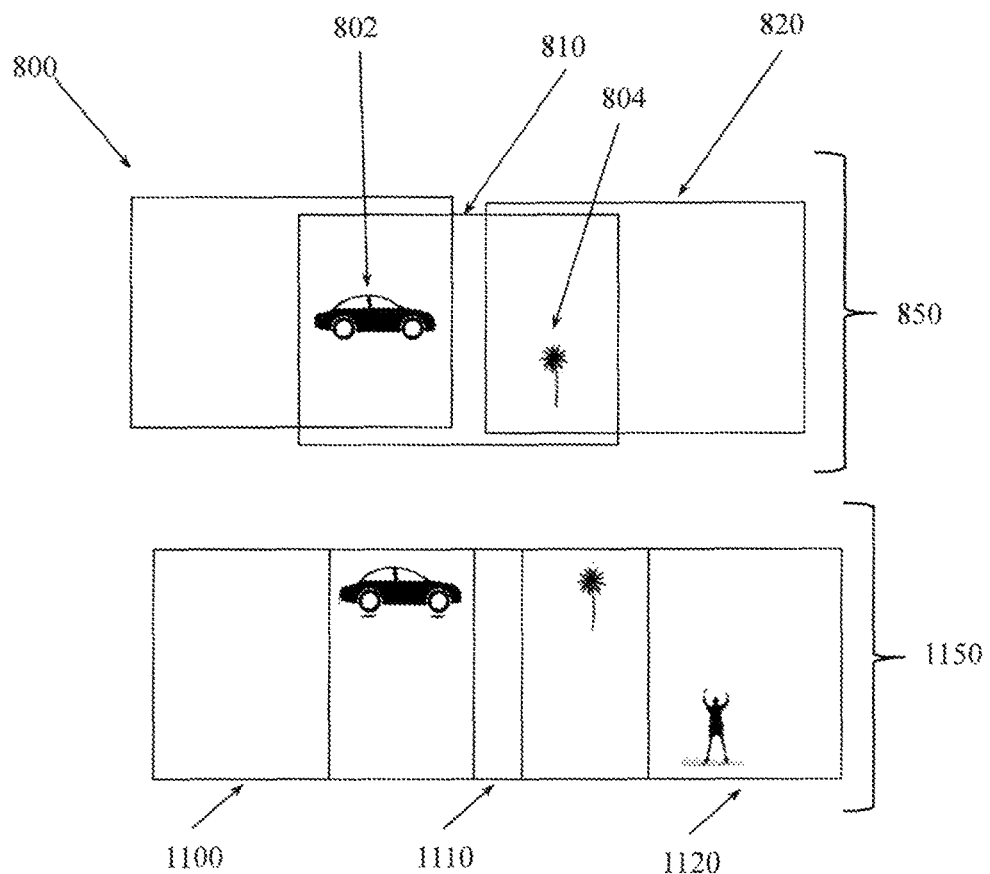
FIG. 12 illustrates strips of frames being aligned.

FIG. 12 illustrates frames 1100, 1110, and 1120 after they have been stitched into a strip of frames 1150 using pattern matching based on common features in overlapping portions of frames 1100, 1110, and 1120.

Figure 13:
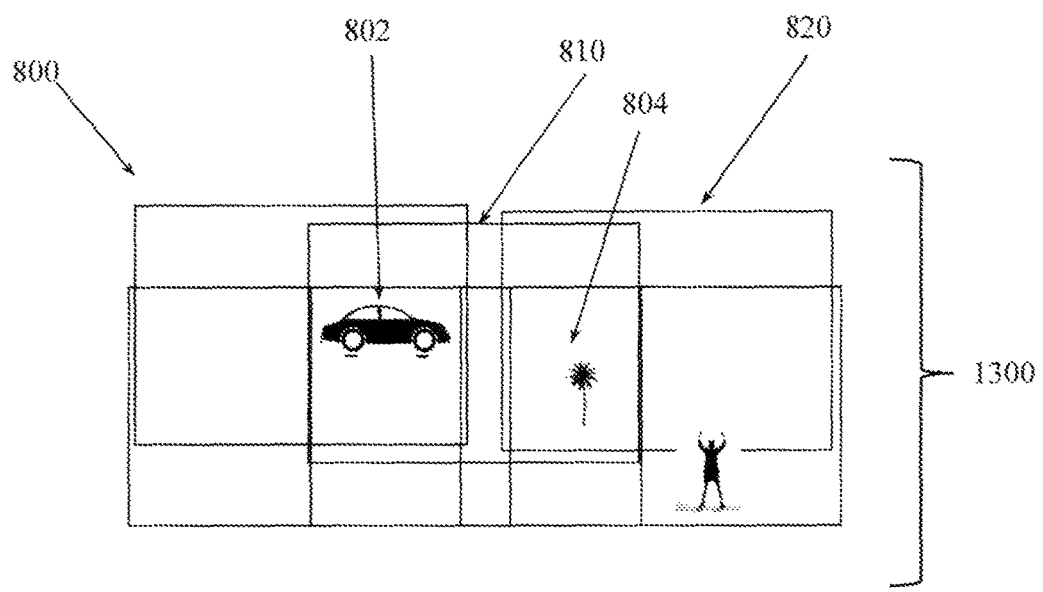
FIG. 13 illustrates strips of frames being aligned.

FIG. 13 illustrates how strips of frames have been stitched together to produce a panoramic image 1300. Strips of frames may be roughly positioned based on azimuthal and elevation information, and may then be more finely positioned based on pattern matching of common elements in overlapping regions of the strips of frames.

Figure 14:
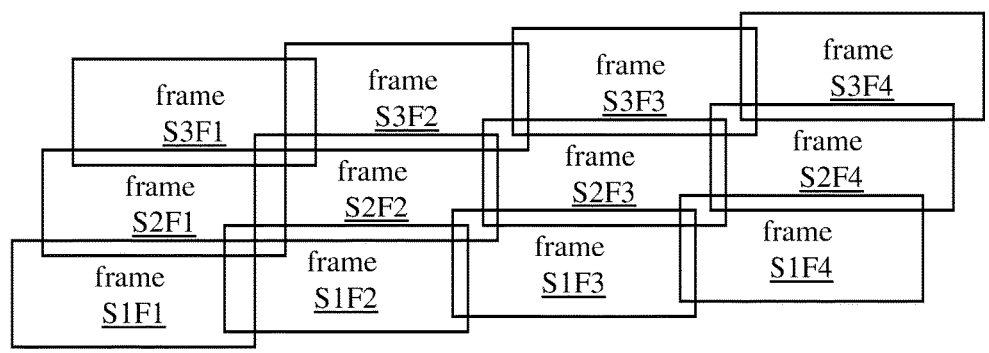
FIG. 14 illustrates frames positioned together to produce a panoramic view image.

FIG. 14 illustrates a more complex panoramic image that is stitched together from a greater number of frames. FIG. 14 illustrates a first strip of frames that includes frames S1F1, S1F2, S1F3, and S1F4. These frames may have been roughly positioned using azimuthal and elevation information and then more finely positioned using pattern matching on elements in overlapping regions. FIG. 14 also illustrates a second strip of frames that includes frames S2F1, S2F2, S2F3, and S2F4. These frames may also have been roughly positioned using azimuthal and elevation information and then more finely positioned using pattern matching on elements in overlapping regions. The first strip of frames may then have been stitched together with the second strip of frames. This stitching may have occurred while additional frames were being acquired. This stitching may also have included rough positioning based on information provided by positional encoders and finer positioning based on pattern matching. FIG. 14 illustrates a third strip of frames that includes frames S3F1, S3F2, S3F3, and S3F4. These frames may have been roughly positioned using azimuthal and elevation information and then more finely positioned using pattern matching on elements in overlapping regions. These strips of frames may then have been added to the growing panoramic image. In one embodiment, frame acquisition, frame rough alignment, frame fine alignment, strip rough alignment, and strip fine alignment may be occurring in parallel. The parallelism may be achieved using multiple processors, multiple threads, multiple processes, or combinations thereof.

Figure 15:
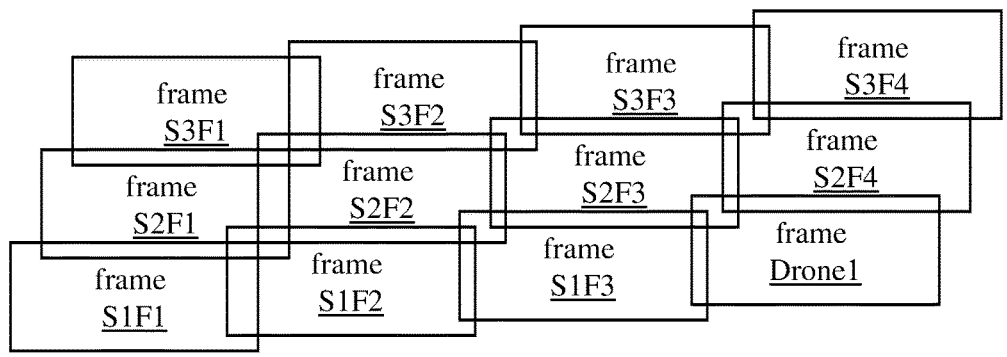
FIG. 15 illustrates imagery from a drone being added to a panoramic view image.

FIG. 15 shows the frames from FIG. 14 but with frame S1F4 having been replaced by frame Drone1 from a drone. A portion of the scene in S1F4 may have become obscured by smoke or in some other way. An example PVIS may therefore have controlled a drone to move to a position where the scene in S1F4 could be viewed. The drone may then have been controlled to acquire an image using imaging parameters that will facilitate stitching frame Drone1 into the set of frames S1F1 . . . S3F4. The frame Drone1 may have drone position and orientation information associated with it. The drone position and orientation information may be used for rough positioning of the frame Drone1. After rough positioning, pattern matching of items in overlapping regions may be performed to achieve more precise positioning.

To form a composite-panoramic image, frames (e.g., individual images, individual frames) are arranged together in a process called stitching. An initial rough arrangement of individual frames is performed using information from a position encoder or encoders on the positioner or positioners (e.g., horizontal positioner, vertical positioner) in which the image data capture apparatus resides or using position and orientation information from a drone. In one embodiment, multiple position encoders may be employed. In another embodiment, a single combined position encoder may be employed. The panoramic image may be integrated with information or imagery provided by a drone. In one embodiment, the drone may provide position (e.g., x, y, z co-ordinates) information and orientation (e.g., azimuth, elevation) information that facilitate integrating imagery from the drone with imagery from the PVIS. In one embodiment, the drone may itself carry a PVIS.

Stitching is performed using pattern matching on overlapping portions of frames. The pattern matching may involve, for example, edge matching of items visible in the frames. The edge matching may be performed in the horizontal plane, the vertical plane, or in other dimensions or combinations of dimensions. The pattern matching facilitates placing corrected, de-warped frames in the proper location for providing a seamless panoramic image from the individual frames captured at various orientations of the imaging camera(s). This positioning after correction and de-warping facilitates joining frames more precisely than in conventional systems to produce a superior composite panoramic image that does not exhibit poor scene/image edge matching and thus does not resemble a "mosaic of tiles".

Pattern matching may include identifying common features that are suitable for alignment. The locations of the common features in adjacent frames are determined and then information about the current field of view is used to position the adjacent frames. If the features overlap to within a threshold amount, then the current field of view may be correct. If there is an offset between the features, then the field of view may need to be corrected to facilitate accurate alignment. This verification may be performed for pairs of adjacent frames as an on-going verification that the FOV is correct and that images are being stitched together correctly. Or, if there is an offset between features then an item (e.g., drone, vehicle, person) may have moved by an amount that caused the misalignment. Thus, in one embodiment, misalignment may trigger an intruder or movement alert. The intruder or movement alert may in turn trigger drone detection processing.

Once a pair of adjacent frames have been stitched together using pattern matching, information about the pattern matching may be maintained to facilitate a subsequent stitching of the frames. For example, the location of edges or elements, the amount of overlap required for pattern matching, or other pattern matching information may be stored. In one embodiment, changes in the edges may indicate a change in the scene, which may in turn indicate the arrival, departure, or movement of a drone.

Figure 16:
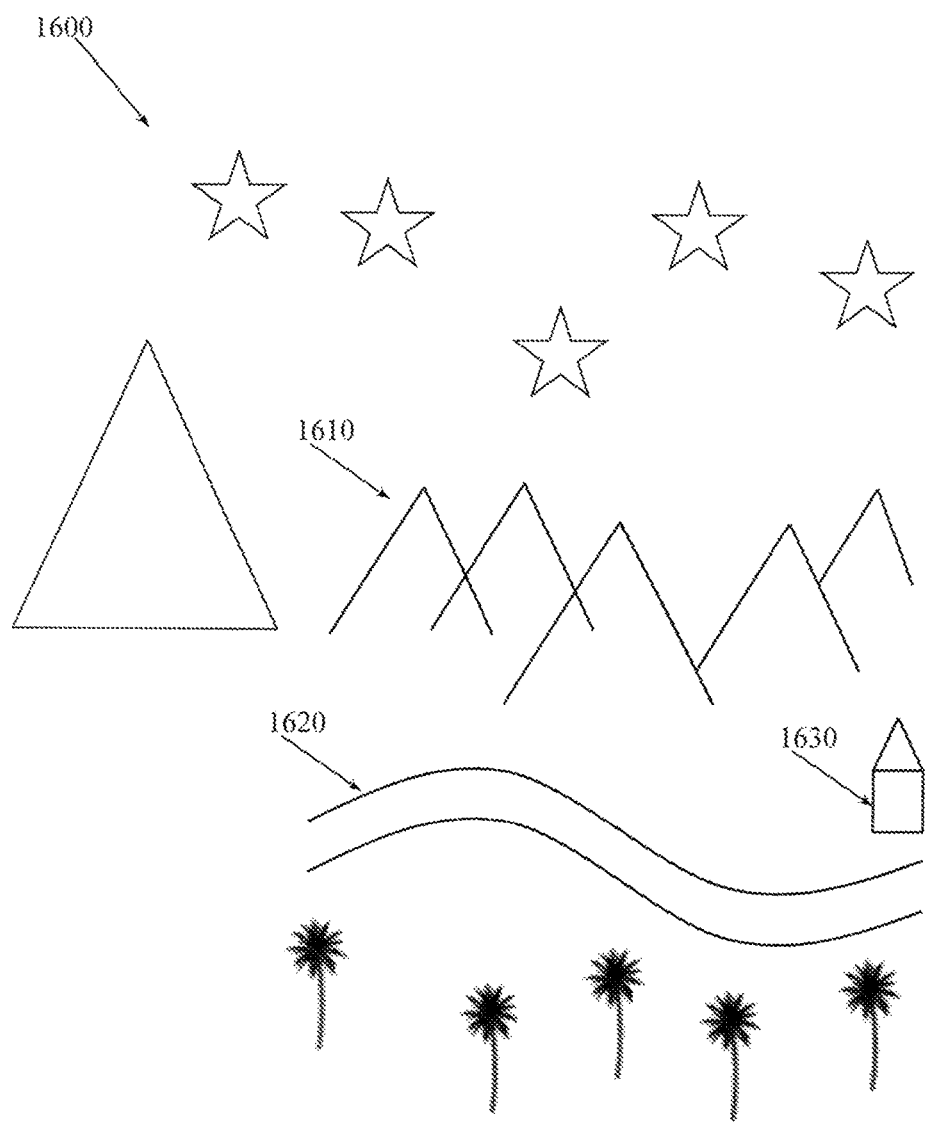
FIG. 16 illustrates a scene.

FIG. 16 illustrates a scene 1600 that includes mountains 1610, a river 1620, and a building 1630. Scene 1600 also includes other elements including brush in the foreground and stars overhead. A user may only be interested in imaging a portion of the scene 1600. Example apparatus and methods facilitate identifying portions of a scene to be imaged and portions to be ignored.

Figure 17:
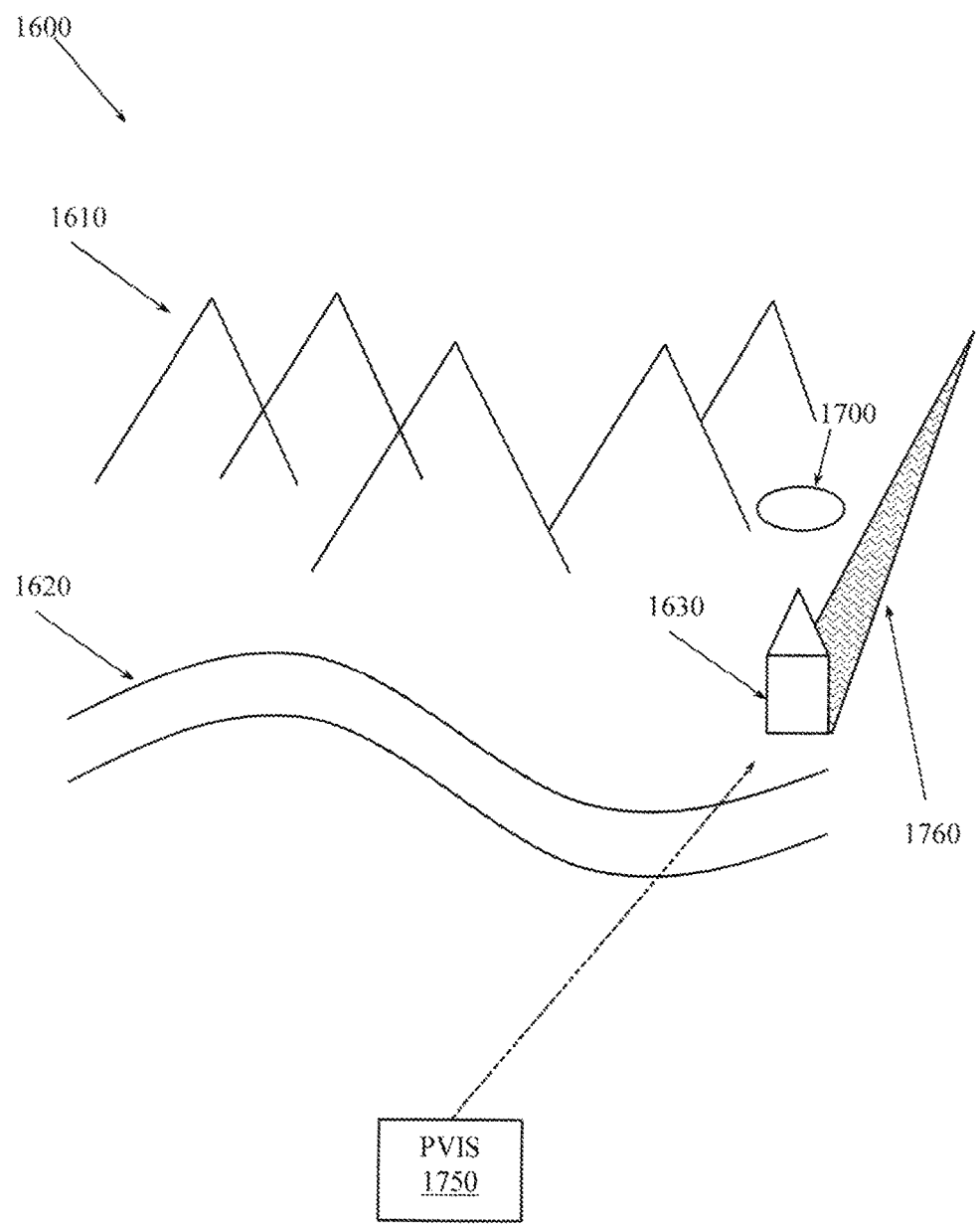
FIG. 17 illustrates a portion of a scene with a drone providing additional imagery.

For example, FIG. 17 illustrates a portion of scene 1600 that a user has selected. An example PVIS 1750 may position drone 1700 to acquire images that cover the space behind building 1630 to eliminate a blind spot 1760. The drone 1700 may be positioned to facilitate "looking through" building 1630 to see what is behind it. In one embodiment, when a panoramic image is displayed, the system may alternate between showing the visible part of the building 1630 and then showing what is behind the building 1630 in blind spot 1760. In one embodiment, a user may have the choice to select whether to see the visible part of the building 1630 or what is behind the building 1630 in the blind spot 1760. For example, an icon may appear on a panoramic image and the user can select the view by interacting with the icon.

Figure 18:
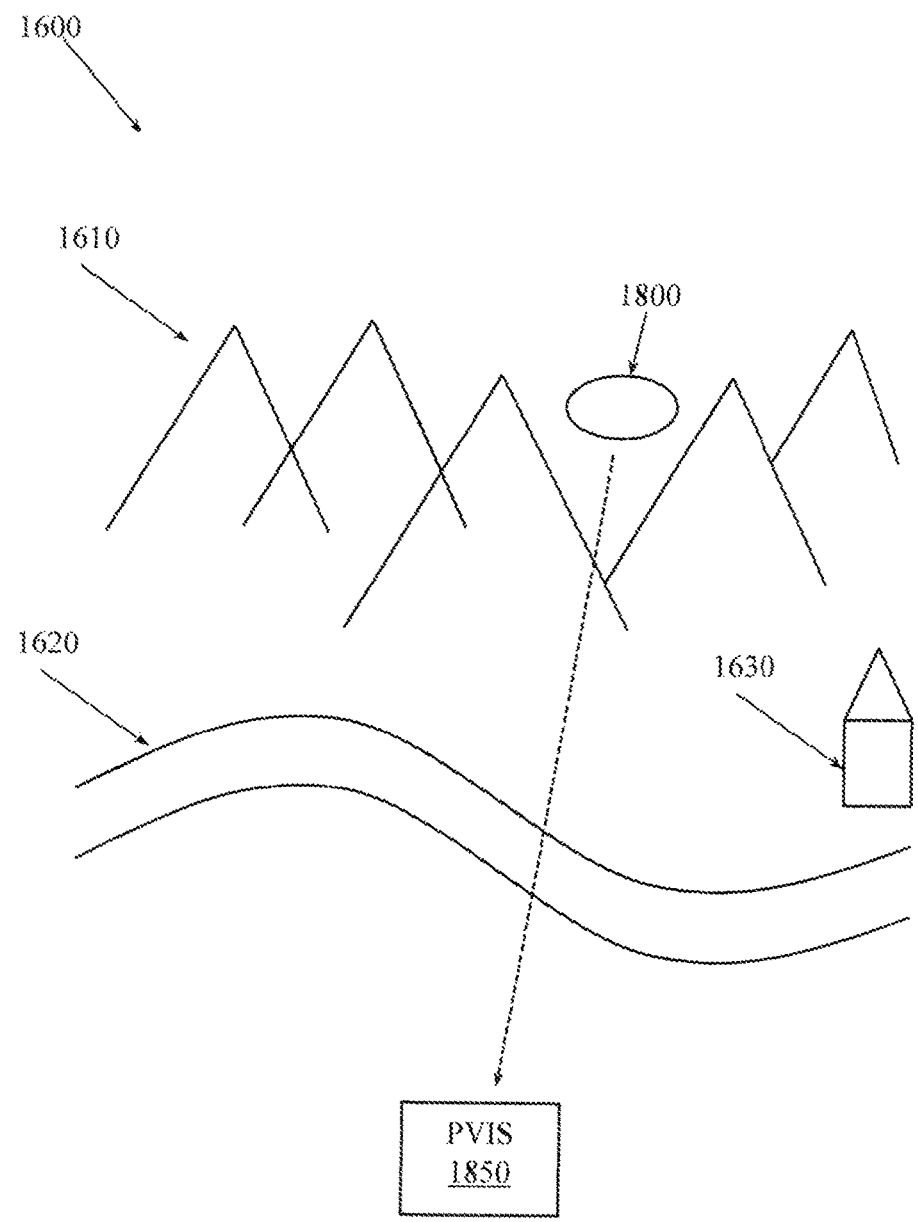
FIG. 18 illustrates a drone providing lookback data.

FIG. 18 illustrates the scene 1600 with a drone 1800 positioned to look back at PVIS 1850. Looking back at PVIS 1850 may include taking an image of PVIS 1850 from the point of view of drone 1800. Imaging PVIS 1850 from the point of view of drone 1800 may facilitate determining whether PVIS 1850 is well-positioned with respect to its surroundings, lines of sight, concealment, or in other ways.

Figure 19:
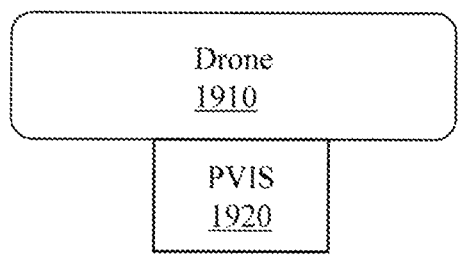
FIG. 19 illustrates a drone providing data from a drone-based PVIS.
Figure 19:
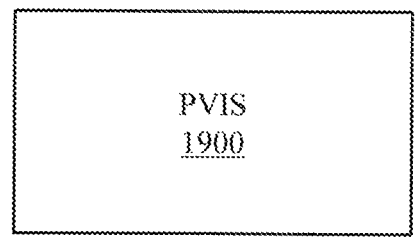

FIG. 19 illustrates a PVIS 1900 and a PVIS 1920 in a drone 1910. In one embodiment, PVIS 1900 and drone 1920 may operate autonomously to produce a panoramic image of a scene. In another embodiment, PVIS 1920 may work together with PVIS 1900 to produce an enhanced panoramic image.

Figure 20:
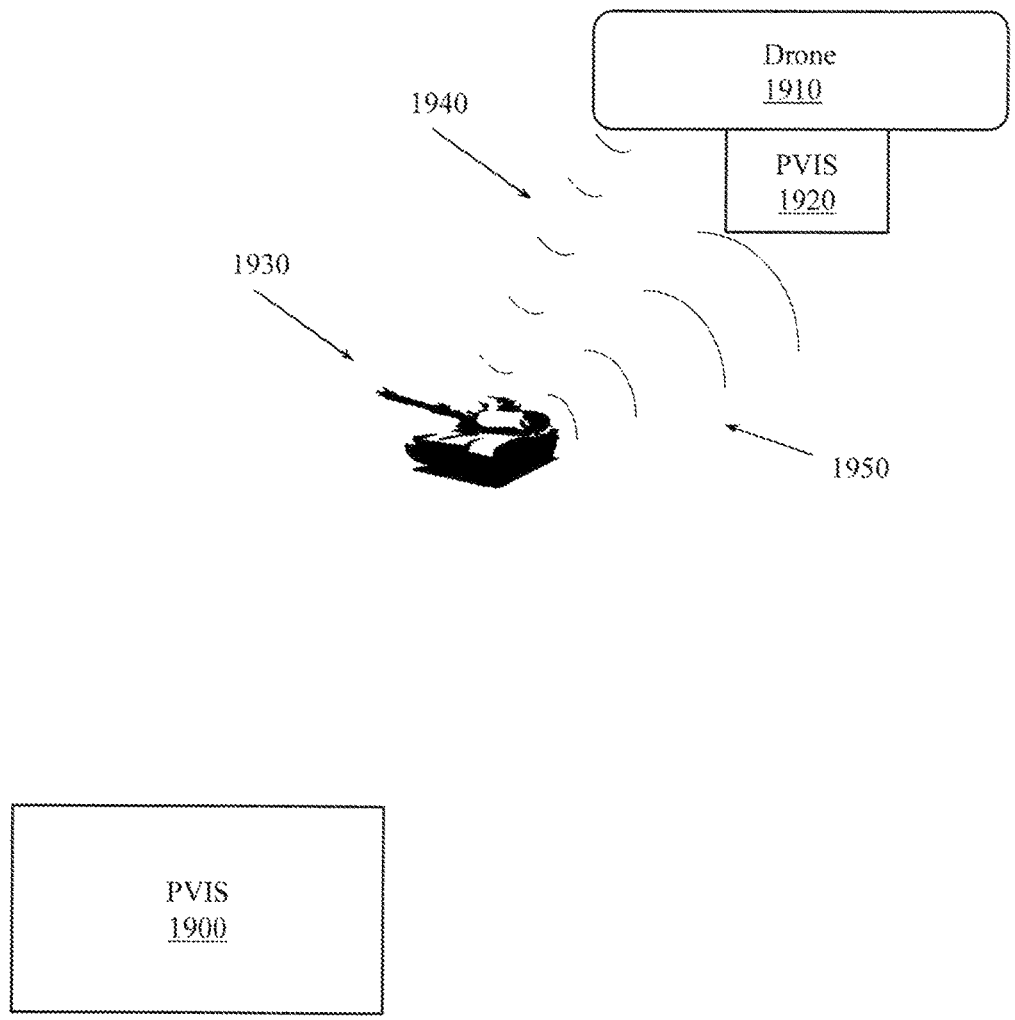
FIG. 20 illustrates a drone providing data from an active sensor.

FIG. 20 illustrates drone 1910 and PVIS 1920 using an active sensor (e.g., radar) to acquire information about an item (e.g., tank 1930). PVIS 1900 may acquire a panoramic image of a scene that includes tank 1930 using passive sensors. Using drone 1910 and PVIS 1920 to acquire data or imagery using active sensors may allow PVIS 1900 to remain in a passive mode, which may in turn facilitate PVIS 1900 remaining undetected.

Figure 21:
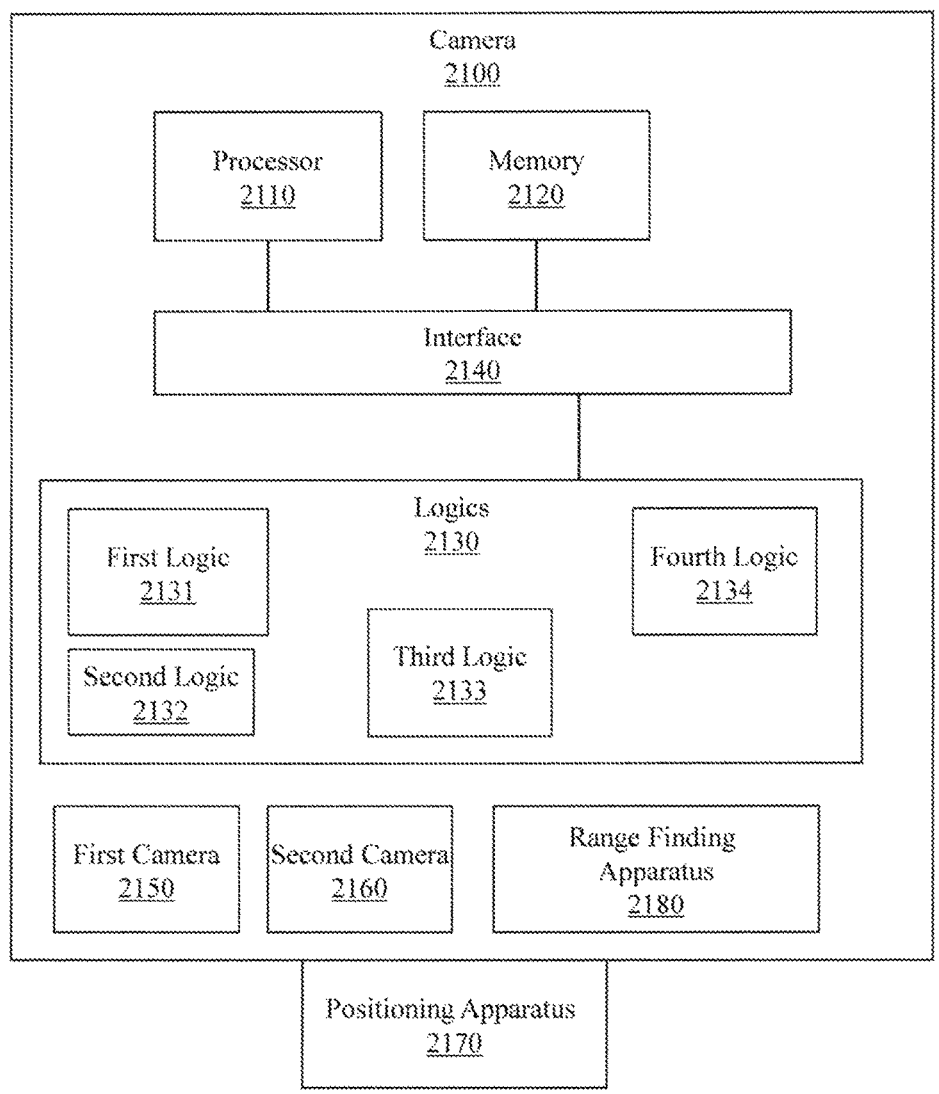
FIG. 21 illustrates an apparatus that produces a panoramic view image based, at least in part, on data or imagery provided by a drone.

FIG. 21 illustrates a panoramic imaging camera 2100 that performs panoramic view imaging. Camera 2100 includes a processor 2110, a memory 2120, a first camera 2150 comprising a lens and sensor, a second camera 2160 comprising a lens and sensor, a positioning apparatus 2170, and a set 2130 of logics that is connected to the processor 2110 and memory 2120 by a computer hardware interface 2140.

The first camera 2150 may produce frames from electromagnetic radiation in a first spectrum (e.g., visible light) while the second camera 2160 may produce frames from electromagnetic radiation in a second spectrum (e.g., IR, UV). The electromagnetic radiation acquired by first camera 2150 and second camera 2160 may be acquired passively and simultaneously.

In one embodiment, camera 2100 may produce images from data acquired from more than one sensor. In this embodiment, camera 2100 combines an image from one spectrum with an image from another spectrum. The image from the other spectrum may be acquired from the second camera 2160. The combining may be performed at the image level, the strip of frames level, or the frame level.

Camera 2100 includes a positioning apparatus 2170 that pans and tilts the camera 2100 or the first camera 2150 and the second camera 2160 and that provides data about the pan and tilt orientation of the camera 2100 or the first camera 2150 and the second camera 2160 at which a frame was acquired.

In one embodiment, camera 2100 may enhance images using data acquired from sensors in a drone. The enhancements may be, for example, additional colors, textual annotations, graphical annotations, imagery, replacement imagery, or other enhancements.

In one embodiment, the functionality associated with the set of logics 2130 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs). In one embodiment, individual members of the set of logics 2130 are implemented as ASICs or SOCs. In one embodiment, the first logic 2131, the second logic 2132, the third logic 2133, or the fourth logic 2134 may be ASICs, FPGA, or other integrated circuits.

The set 2130 of logics includes a first logic 2131 that produces individual frames from electromagnetic radiation acquired by the first camera 2150, the second camera 2160, or a drone. Different individual frames may be acquired with different operating parameters. The operating parameters may include, for example, horizontal position, vertical position, target grid co-ordinates, pitch, yaw, field of view, focal length, depth of field, light intensity, angle of light, temperature, humidity, atmospheric pressure, pan rate, tilt rate, change in pan rate, or change in tilt rate. The camera 2100 and the drone may acquire frames using different parameters (e.g., horizontal position, vertical position, field of view, zoom). Thus, frames from the drone may have different properties than frames from camera 2100. Therefore, first logic 2131 may correct or adjust a frame from a drone so that it will be suitable for pattern matching and stitching together with frames acquired by the first camera 2150 or the second camera 2160.

The camera 2100 also includes a second logic 2132 that produces a strip of frames. The strip of frames may be pieced together from a plurality of individual frames produced by the first logic 2131. In one embodiment, the second logic 2132 produces the strip of frames by positioning individual frames produced by the first logic 2131 in the strip of frames based on a pan and tilt orientation associated with the individual frame as provided by the positioning apparatus 2170 or based on drone position and orientation information, and then selectively repositioning individual frames in the strip of frames based on edge detection pattern matching in regions where adjacent frames in the strip of frames overlap. In one embodiment, information about the edge detection pattern matching may be persisted to facilitate detecting changes in frames subsequently acquired with the same pan and tilt orientation. The persisted information may also be used to increase the efficiency of subsequent rough positioning and repositioning of frames acquired with the same pan and tilt orientation or with the same drone position and orientation information. Persisting the information may include storing the information in memory 2120 or on a computer-readable medium available to camera 2100. The information that is persisted may include, for example, a number of edges, a location of an edge, an edge orientation, or other information.

The camera 2100 also includes a third logic 2133 that produces a panoramic image. The panoramic image is pieced together from two or more strips of frames processed by the second logic 2132. In one embodiment, the third logic 2133 produces the panoramic image by positioning individual strips of frames produced by the second logic 2132 in the panoramic image based on a pan and tilt orientation associated with individual frames in the strips of frames as provided by the positioning apparatus 2170 or based on position and orientation information provided by the drone, and then selectively repositioning individual strips of frames in the panoramic image based on edge detection pattern matching in regions where adjacent frames in the strips of frames overlap. In one embodiment, information about the edge detection pattern matching may be persisted to facilitate detecting changes in strips of frames subsequently acquired with the same pan and tilt orientation or with the same drone position and orientation information. The persisted information may also be used to increase the efficiency of subsequent rough positioning and repositioning of strips of frames acquired with the same pan and tilt orientation.

The camera 2100 also includes a fourth logic 2134 that communicates with the drone. Communicating with the drone may include receiving sensor data or imagery data. The imagery data may include drone position and orientation data, image acquisition parameters for the drone, or data from which an image can be made. The sensor or imagery data may include imagery from different cameras (e.g., visual, IR, NIR, LWIR) or from other sensors (e.g., thermometer, barometer, Geiger counter). The imagery from the drone may be added to the panoramic image, blended into the panoramic image, or used in other ways to enhance the panoramic image produced from imagery provided by the first camera 2150 or the second camera 2160. The data may be used to enhance (e.g., annotate, shade, color code, correct) the panoramic image.

For example, the third logic 2133 may replace a portion of the panoramic image with imagery from the drone. For example, the third logic 2133 may remove imagery of an object (e.g., building, berm) that occludes a blind spot and may insert imagery of the blind spot taken by the drone.

The fourth logic 2134 interacts with a drone. Interacting with the drone may include receiving imagery or other data from the drone. Interacting with the drone may also include sending commands to the drone. The commands may be used to position the drone, to control the drone to acquire imagery or data, to control the drone to deliver ordinance, or to perform other actions. In one embodiment, the fourth logic 2134 may control the drone to acquire imagery of the camera 2100 itself. This may facilitate determining the suitability of the location at which camera 2100 is positioned.

An image acquisition assembly may include a lens and a sensor. A lens has a focal length. Example apparatus and methods may change the focal length to facilitate zooming in or zooming out. Changing the zoom may change the FOV. For example, when zoomed all the way out, the FOV may have a first (e.g., larger) size and when zoomed all the way in may have a second (e.g., smaller) size. The focal length may be known for various configurations of lens and sensor. However, in the field, a PVIS may experience stressful operating conditions that may affect the actual focal length. For example, a PVIS may experience dramatic temperature changes during a day. In the high desert, at midday, temperatures may exceed 120 F while at night temperatures may fall below 32 F. Thus, significant thermal expansion or contraction may occur during a period of hours in a lens, a sensor, and the PVIS in which the lens and sensor are located. Example apparatus and methods may therefore use calibration data acquired under varying temperature, pressure, humidity, or other environmental conditions and a deployed unit may dynamically adapt its correction approach based on sensed conditions. Example apparatus and methods may account for these aberrations.

In one embodiment, camera 2100 may control a drone to take up a known position so that the effective focal length of a camera in camera 2100 can be determined or confirmed. For example, when the drone has a known size or is displaying a calibration pattern of a known size, and when the drone is precisely positioned with respect to the camera 2100, then the imaged size of the drone or pattern may facilitate determining or confirming the effective focal length of the first camera 2150 or second camera 2160.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 22:
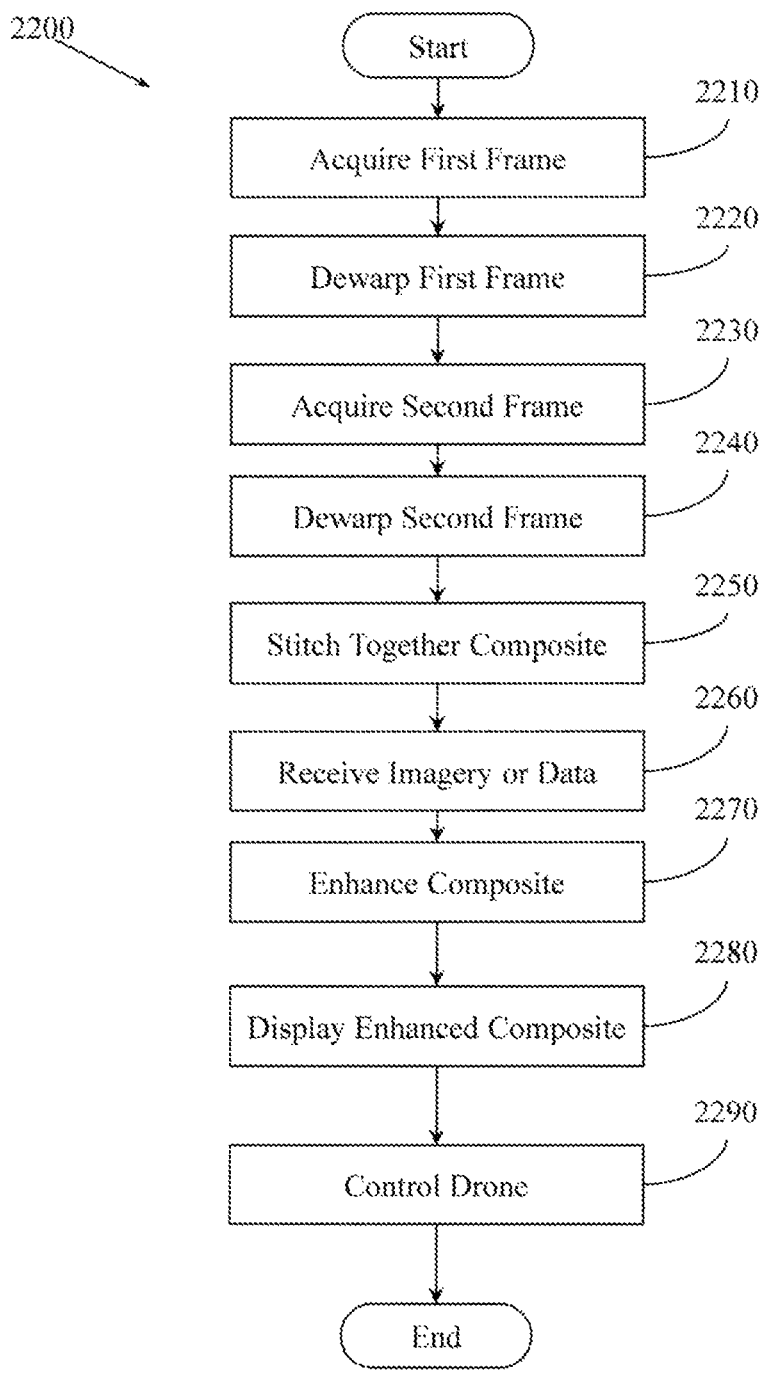
FIG. 22 illustrates a method for producing a panoramic view image based, at least in part, on data or imagery provided by a drone.

FIG. 22 illustrates an example computerized method 2200 associated with a PVIS. Method 2200 can only be performed in a computer or circuit because electronic voltages or other computer signals need to be generated to produce the panoramic view image. These electronic voltages or other computer signals cannot be generated by pen and paper or in the human mind.

Method 2200 includes, at 2210, acquiring a first frame from a PVIS. The first frame is acquired at a first pan and tilt orientation. Method 2200 also includes, at 2220, de-warping the first frame. Method 2200 also includes, at 2230, acquiring a second frame from the PVIS. The second frame is acquired at a second pan and tilt orientation. Method 2200 also includes, at 2240, de-warping the second frame. In one embodiment, the first frame and second frame may be de-warped in parallel.

Method 2200 also includes, at 2250, stitching together a composite image from the first frame and the second frame. The composite image will have a greater field of view than either the first frame or the second frame. In one embodiment, stitching together the composite image includes positioning the first frame and the second frame with respect to each other based on the first pan and tilt orientation and the second pan and tilt orientation. Stitching together the composite image then includes repositioning the first frame and the second frame with respect to each other based on pattern matching in a region where the first frame and the second frame overlap.

Method 2200 also includes, at 2260, receiving imagery or data from a drone. The data may come from active sensors (e.g., radar, sonar) or passive sensors (e.g., thermometer). The imagery may be in the visual spectrum or in the other spectra (e.g., IR, NIR, SWIR, LWIR, UV). The imagery may come from a staring camera in the drone or a PVIS located in the drone.

Method 2200 also includes, at 2270, enhancing the composite image based, at least in part, on the imagery or data received from the drone. Enhancing the composite image may include annotating the composite image with, for example, temperature information, barometric pressure information, humidity information, radiation information, or other information.

Method 2200 also includes, at 2280, displaying the enhanced composite image. In one embodiment, displaying the composite image may include selectively playing sounds acquired by the drone. The sounds may be played when, for example, a user selects a certain portion of the composite image being displayed.

Method 2200 also includes, at 2290, controlling the drone. Controlling the drone may include, for example, positioning the drone, directing the drone to acquire imagery or sensor data, directing the drone to perform an action (e.g., deliver ordinance), or other action.

In one example, a method may be implemented as computer executable instructions. Thus, in one example, a computer-readable medium may store computer executable instructions that if executed by a machine (e.g., processor) cause the machine to perform method 2200. While executable instructions associated with method 2200 are described as being stored on a computer-readable medium, it is to be appreciated that executable instructions associated with other example methods described herein may also be stored on a computer-readable medium.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, refers to computer hardware or firmware, and/or combinations of each to perform a function(s) or an action(s), and/or to cause a function or action from another logic, method, and/or system. Logic may include, for example, an instruction controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to, electrical signals, optical signals, analog signals, digital signals, data, computer instructions, processor instructions, messages, a bit, or a bit stream, that can be received, transmitted and/or detected.

"User", as used herein, includes but is not limited to one or more persons, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A panoramic view imaging system (PVIS), comprising:
a visual light frame acquisition assembly comprising a lens and a sensor that produces a frame from light in a visible spectrum, where the light in the visible spectrum is acquired passively from a scene;
a rotational position controller that pans the visual light frame acquisition assembly through a range of horizontal imaging positions;
a rotational position encoder that produces data describing a rotational position at which light for the frame is acquired;
an elevation position controller that tilts the visual light frame acquisition assembly through a range of vertical imaging positions;
an elevation position encoder that produces data describing an elevation position at which light for the frame is acquired;
an image processor that produces a panoramic image from a plurality of frames produced by the visual light frame acquisition assembly; and
a drone integration apparatus that enhances the panoramic image based, at least in part, on data communicated to the PVIS from a drone;
where the plurality of frames are acquired under varying operating parameters including drone communication range or drone operating range, and at least one of horizontal position, vertical position, target grid co-ordinates, pitch, yaw, field of view, focal length, depth of field, light intensity, angle of light, temperature, humidity, atmospheric pressure, pan rate, tilt rate, change in pan rate, or change in tilt rate,
where the panoramic image has a field of view greater in both a horizontal dimension and a vertical dimension than a single frame acquired by the visual light frame acquisition assembly or by the drone, and
where the panoramic image is produced without using a hemispherical mirror or a fisheye lens.

2. The panoramic view imaging system of claim 1,
where the range of horizontal imaging positions is three hundred and sixty degrees, and where the range of vertical imaging positions is at least one hundred and eighty degrees,
where the image processor corrects or de-warps the frame based, at least in part, on calibration data associated with the lens or sensor,
where the image processor produces a strip of frames from two or more frames acquired by the visual light frame acquisition assembly, where producing the strip of frames includes:
producing an initial positioning of the two or more frames based, at least in part, on information from the rotational position encoder or the elevation position encoder, and
producing a refined positioning of the two or more frames based, at least in part, on pattern matching of an item visible in overlapping portions of the two or more frames,
and
where the image processor produces the panoramic image from two or more strips of frames by:
producing an initial position of the two or more strips of frames based, at least in part, on information from the rotational position encoder or the elevation position encoder, and
producing a refined positioning of the two or more strips of frames based, at least in part, on pattern matching of an item visible in the overlapping portions of the two or more strips of frames.

3. The panoramic view imaging system of claim 1, comprising:
a second frame acquisition assembly comprising a second lens and a second sensor that produces a plurality of second frames from electromagnetic radiation in a spectrum outside the visible spectrum,
where the electromagnetic radiation in the spectrum outside the visible spectrum is acquired passively from the scene, and
where the image processor produces a second panoramic image from the plurality of second frames, and produces a combined panoramic image from the first panoramic image and the second panoramic image.

4. The panoramic view imaging system of claim 3, where the spectrum outside the visible spectrum is in the infrared (IR) range, the near IR (NIR) range, the short wave IR (SWIR) range, the mid wave IR (MWIR) range, or the long wave IR (LWIR) range.

5. The panoramic view imaging system of claim 1, where the data communicated to the PVIS from the drone is sensor data acquired by a passive sensor in the drone or by an active sensor in the drone, and where the drone integration apparatus enhances the panoramic image based, at least in part, on the sensor data.

6. The panoramic view imaging system of claim 5, where the drone integration apparatus enhances the panoramic image by annotating the panoramic image with information associated with the sensor data.

7. The panoramic view imaging system of claim 1, where the data communicated to the PVIS from the drone is imagery data, and where the drone integration apparatus enhances the panoramic image based, at least in part, on the imagery data.

8. The panoramic view imaging system of claim 7, where the drone integration apparatus enhances the panoramic image by replacing a portion of the panoramic image based, at least in part, on the imagery data or by adding to the panoramic image based, at least in part, on the imagery data.

9. The panoramic view imaging system of claim 7, where the drone integration apparatus replaces a portion of the panoramic image that produces a blind spot behind an occluding object with imagery of the blind spot, where the imagery of the blind spot is based, at least in part, on the imagery data.

10. The panoramic view imaging system of claim 1, where the drone integration apparatus produces a look back view of the panoramic view imaging system based, at least in part, on the imagery data.

11. The panoramic view imaging system of claim 1, where the drone integration apparatus corrects the imagery data before enhancing the panoramic image, where correcting the imagery data includes changing a zoom level of the imagery data, changing a color associated with the imagery data, changing a field of view of the imagery data, or changing an intensity associated with the imagery data.

12. The panoramic view imaging system of claim 1, where the drone integration apparatus receives imagery data from a panoramic view imaging system on the drone.

13. The panoramic view imaging system of claim 3, where the image processor:
persists data associated with the initial positioning of the two or more frames and with refining the positioning of the two or more frames,
persists data associated with the initial positioning of the two or more strips of frames and with refining the positioning of the two or more strips of frames, and
sends a position command to the drone based, at least in part, on persisted data associated with the initial positioning of the two or more frames, on persisted data associated with the refined positioning of the two or more frames, on persisted data associated with the initial positioning of the two or more strips of frames, or on persisted data associated with the refined positioning of the two or more strips of frames.

14. The panoramic view imaging system of claim 1, where the drone integration apparatus sends a position command to the drone, where the position command is associated with determining an effective focal length for the visual light frame acquisition assembly or with an object detection resolution threshold event.

15. The panoramic view imaging system of claim 13, where the drone integration apparatus produces a movement alert upon detecting a change between a first instance of a first frame acquired at a first time and a second instance of the first frame acquired at a second time based, at least in part, on a change in the item visible in overlapping portions of the two or more frames.

16. The panoramic view imaging system of claim 1, comprising a range apparatus that has access to range information for a plurality of locations in the frame, where the range information is associated with a virtual spherical wire grid of the scene.

17. The panoramic view imaging system of claim 16, where the range apparatus produces a movement alert upon detecting a change in a range associated with an object in a first instance of a first frame acquired at a first time and a second instance of the first frame acquired at a second time.

18. A panoramic imaging camera, comprising:
a first camera comprising a lens and a sensor that produces frames from electromagnetic radiation in a first spectrum, where the electromagnetic radiation in the first spectrum is acquired passively;
a second camera comprising a lens and a sensor that produces frames from electromagnetic radiation in a second, different spectrum, where the electromagnetic radiation in the second spectrum is acquired passively;
a positioning apparatus configured to pan and tilt the panoramic imaging camera and to provide data about a pan and tilt orientation associated with the first camera or the second camera when a frame is acquired by the first camera or by the second camera;
a processor;
a memory;
a set of logics; and
a hardware interface that connects the processor, the memory, the first camera, the second camera, and the set of logics;
the set of logics comprising:
a first logic that produces an individual frame based on electromagnetic radiation acquired by the first camera, by the second camera, or by a drone;
a second logic that produces a strip of frames pieced together from a plurality of individual frames produced by the first logic;
a third logic that produces a panoramic image pieced together from two or more strips of frames produced by the second logic; and
a fourth logic that communicates with the drone, where communicating with the drone includes receiving sensor data or imagery data, where the imagery data includes drone position information, drone orientation information, drone image acquisition information, and image data, where the frames produced by the first camera, the frames produced by the second camera, and the sensor data or imagery data are acquired under varying operating parameters including drone communication range or drone operating range, and at least one of target grid co-ordinates, field of view, focal length, depth of field, light intensity, angle of light, temperature, humidity, atmospheric pressure, pan rate, tilt rate, change in pan rate, or change in tilt rate.

19. The panoramic imaging camera of claim 18, where the first logic de-warps the individual frame before providing the individual frame to the second logic;
where the second logic produces the strip of frames by positioning individual frames produced by the first logic in the strip of frames based on a pan and tilt orientation associated with the individual frame as provided by the positioning apparatus or based on the drone position information and the drone orientation information, and then selectively repositioning individual frames in the strip of frames based on edge detection pattern matching in regions where adjacent frames in the strip of frames overlap; and
where the third logic produces the panoramic image by positioning individual strips of frames produced by the second logic in the panoramic image based on a pan and tilt orientation associated with individual frames in the strips of frames as provided by the positioning apparatus or based on the drone position information and the drone orientation information, and then selectively repositioning individual strips of frames in the panoramic image based on edge detection pattern matching in regions where adjacent frames in the strips of frames overlap.

20. The panoramic imaging camera of claim 18, where the third logic adds, to the panoramic image, detail information about a portion of the scene depicted in the panoramic image, where the detail information is based, at least in part, on the sensor data.

21. The panoramic imaging camera of claim 18, where the third logic changes the panoramic image to include an image based on the imagery data.

22. The panoramic imaging camera of claim 21, where the third logic changes the panoramic image by removing an object that occludes a blind spot and by adding imagery of the blind spot.

23. The panoramic imaging camera of claim 18, where the fourth logic controls the drone to take a position at a known distance from the panoramic imaging camera to facilitate determining the effective focal length of the first camera or the second camera.

24. The panoramic imaging camera of claim 18, where the fourth logic controls the drone to acquire imagery data of the panoramic imaging camera from a selected location visible in the panoramic image.

25. A computerized method, comprising:
acquiring a first frame from a panoramic view imaging system (PVIS), where the first frame is acquired at a first pan and tilt orientation;

de-warping the first frame;
acquiring a second frame from the PVIS, where the second frame is acquired at a second pan and tilt orientation;
de-warping the second frame;
acquiring a third frame from a drone;
acquiring location and orientation information about the third frame from the drone;
de-warping the third frame;
selectively correcting the third frame to have frame parameters that match frame parameters associated with the first frame or the second frame to within a tolerance, where the frame parameters include zoom level, field of view, color, or intensity;
stitching together a composite image from the first frame, the second frame, and the third frame, where the composite image has a greater field of view than either the first frame, the second frame, or the third frame;
displaying the composite image; and
controlling the drone to move to a location or to perform an action based, at least in part, on information in the composite image,
where the first frame, the second frame, and the third frame are acquired under varying operating parameters including drone communication range or drone operating range, and at least one of target grid co-ordinates, field of view, focal length, depth of field, light intensity, angle of light, temperature, humidity, atmospheric pressure, pan rate, tilt rate, change in pan rate, change in tilt rate.

26. The computerized method of claim 25, where stitching together the composite image includes:
positioning the first frame and the second frame with respect to each other based on the first pan and tilt orientation and the second pan and tilt orientation;
repositioning the first frame and the second frame with respect to each other based on pattern matching in a region where the first frame and the second frame overlap;
positioning the third frame with respect to the first frame or the second frame based, at least in part, on the location and orientation information about the third frame, the first pan and tilt information, or the second pan and tilt information; and
repositioning the third frame with respect to the first frame or the second frame based on pattern matching in a region where the third frame overlaps with the first frame or the second frame.

27. The computerized method of claim 26, comprising:
acquiring, from the drone, a temperature reading, a barometric pressure reading, a humidity reading, or a radiation reading, and
annotating the composite image based, at least in part, on the temperature reading, the barometric pressure reading, the humidity reading, or the radiation reading.

28. The computerized method of claim 26, comprising:
acquiring audio data from a microphone in the drone, and selectively playing sounds associated with the audio data.

* * * * *